US011184436B2

(12) United States Patent
Kochura et al.

(10) Patent No.: US 11,184,436 B2
(45) Date of Patent: Nov. 23, 2021

(54) AUTOMATED STORAGE SELECTION WITH BLOCKCHAIN AND NLP

(71) Applicant: International Business Machines Corporation, Armonk, NY (US)

(72) Inventors: Nadiya Kochura, Bolton, MA (US); Abhishek Malvankar, White Plains, NY (US); Shikhar Kwatra, Durham, NC (US); Jeronimo Irazabal, Roque Perez (AR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/806,082

(22) Filed: Mar. 2, 2020

(65) Prior Publication Data

US 2021/0273992 A1 Sep. 2, 2021

(51) Int. Cl.
*H04L 29/08* (2006.01)
*G06F 40/40* (2020.01)
*H04L 9/32* (2006.01)
*G06F 40/30* (2020.01)

(52) U.S. Cl.
CPC .......... *H04L 67/1093* (2013.01); *G06F 40/30* (2020.01); *G06F 40/40* (2020.01); *H04L 9/3239* (2013.01); *H04L 67/1068* (2013.01); *H04L 2209/38* (2013.01)

(58) Field of Classification Search
CPC ............. H04L 67/1093; H04L 67/1068; H04L 9/3239; H04L 2209/38; G06F 40/40; G06F 40/30
See application file for complete search history.

(56) References Cited

U.S. PATENT DOCUMENTS

| 10,252,145 B2 | 4/2019 | Tran et al. |
| 10,459,990 B1 | 10/2019 | Li et al. |
| 10,554,931 B1* | 2/2020 | Zavesky ............ G06K 9/6215 |
| 10,733,602 B2* | 8/2020 | Setty ................. G06Q 20/3827 |
| 10,764,030 B2* | 9/2020 | Yanagisawa ......... H04L 9/0891 |

(Continued)

FOREIGN PATENT DOCUMENTS

| CN | 107480990 A | 12/2017 |
| WO | 2019068354 A1 | 4/2019 |
| WO | 2019200690 A1 | 10/2019 |

OTHER PUBLICATIONS

Anonymous, "Method and System for Providing an Efficient Service Integration and Management Using a Blockchain," an IP.com Prior Art Database Technical Disclosure, IP.com No. IPCOM000255998D, Oct. 29, 2018, 6 pgs.

(Continued)

*Primary Examiner* — Javier O Guzman
(74) *Attorney, Agent, or Firm* — Jared Montanaro

(57) ABSTRACT

A processor may receive a request for storage in a blockchain network. The request may include information as to a specific storage that is required. The processor may commit the request to the blockchain network. The processor may provide the request to one or more proposing entities. The processor may receive, from the one or more proposing entities, respective proposals in response to the request for storage. The processor may determine which of the respective proposals best match the information included in the request. The processor may automatically accept the best matched proposal.

14 Claims, 18 Drawing Sheets

(56) References Cited

U.S. PATENT DOCUMENTS

| | | | | |
|---|---|---|---|---|
| 10,872,381 | B1* | 12/2020 | Leise | G06F 16/183 |
| 2017/0243177 | A1* | 8/2017 | Johnsrud | G06Q 20/10 |
| 2018/0157558 | A1* | 6/2018 | Karame | G06F 11/1451 |
| 2018/0240165 | A1 | 8/2018 | Kilpatrick | |
| 2018/0247234 | A1* | 8/2018 | Crabtree | G06F 16/58 |
| 2019/0080392 | A1* | 3/2019 | Youb | G06F 21/64 |
| 2019/0097790 | A1* | 3/2019 | Li | H04L 9/085 |
| 2019/0132350 | A1* | 5/2019 | Smith | G06F 16/2379 |
| 2019/0180311 | A1* | 6/2019 | Chan | G06Q 30/0236 |
| 2019/0213187 | A1* | 7/2019 | Sidar | G06Q 50/01 |
| 2019/0258646 | A1* | 8/2019 | Chen | G06F 16/273 |
| 2019/0314726 | A1* | 10/2019 | Masini | G07F 17/326 |
| 2019/0332586 | A1* | 10/2019 | Wang | G06Q 40/02 |
| 2019/0347658 | A1* | 11/2019 | Haimes | G06Q 20/04 |
| 2019/0377617 | A1* | 12/2019 | Jacobs | G06F 13/4068 |
| 2019/0394023 | A1* | 12/2019 | Menon | H04L 9/3242 |
| 2020/0026862 | A1* | 1/2020 | Zhang | G06F 9/466 |
| 2020/0027093 | A1* | 1/2020 | Volk | G06Q 30/016 |
| 2020/0028688 | A1* | 1/2020 | Takada | H04L 9/3247 |
| 2020/0067697 | A1* | 2/2020 | Puddu | G06F 21/602 |
| 2020/0167319 | A1* | 5/2020 | Fritz | H04L 41/0806 |
| 2020/0192770 | A1* | 6/2020 | Walid | H04L 9/3247 |
| 2020/0252224 | A1* | 8/2020 | Tomaselli | H04L 9/3268 |

OTHER PUBLICATIONS

Anonymous, "Method for Storing Content in Cloud Storage Services," an IP.com Prior Art Database Technical Disclosure, IP.com No. IPCOM000256491D, Dec. 4, 2018, 5 pgs.

Anonymous, "Smart Client or Web Management Interface to Detect Object Storage Usage beyond Ordered Quantities in Real Time," an IP.com Prior Art Database Technical Disclosure, IP.com No. IPCOM000241620D, May 18, 2015, 4 pgs.

Apache, "Publishing Releases," http://www.apache.org/dev/release-publishing.html, printed Jan. 3, 2020, 4 pgs.

Ethereum, "Ethereum," https://www.ethereum.org/, printed Jan. 3, 2020, 1 pg.

IBM, "Watson Natural Language Understanding—Overview," https://www.IBM.com/watson/services/natural-language-understanding/, printed Jan. 3, 2020, 3 pgs.

Mccubin, G., "Intro to Web3.js—Ethereum Blockchain Developer Crash Course | Dapp University," https://www.dappuniversity.com/articles/web3-js-intro, printed Jan. 3, 2020, 18 pgs.

Mell et al., "The NIST Definition of Cloud Computing," Recommendations of the National Institute of Standards and Technology, U.S. Department of Commerce, Special Publication 800-145, Sep. 2011, 7 pgs.

Patil et al., "Cloud Object Storage as a Service," IBM Cloud Object Storage from Theory to Practice, IBM.com/redbooks, Mar. 2017, 290 pgs.

Signoretti, E., "Multi-Cloud Object Storage and Data Mobility," https://gigaom.com/report/multi-cloud-object-storage-and-data-mobility-a-gigaom-market-landscape-report/, printed Jan. 3, 2020, 2 pgs.

Unknown, "4 Major Benefits of Using Object Storage—PSCC Labs," https://pssclabs.com/article/4-major-benefits-of-using-object-storage/, printed Jan. 3, 2020, 1 pg.

Unknown, "Introduction to Smart Contracts—Solidity 0.4.24 documentation," https://solidity.readthedocs.io/en/V0.4.24/introduction-to-smart-contracts.html, printed Jan. 3, 2020, 6 pgs.

Wang et al., "ChainSplitter: Towards Blockchain-based Industrial IoT Architecture for Supporting Hierarchical Storage," 2019 IEEE International Conference on Blockchain, DOI https://doi.org/10.1109/Blockchain.2019.00030, 10 pgs.

* cited by examiner

690

Block$_i$

Header 672$_i$

- Hash Value of Previous Block
- Reference Information

File(s) (and Metadata) 674$_i$

| Data 1 | REF 1 | Metadata 1 |
| Data 2 | REF 2 | Metadata 2 |
| . | . | . |
| . | . | . |
| . | . | . |
| Data N | REF N | Metadata N |

Value 676$_i$ (based on one or more of)

- New Hash Value of File
- New Storage Location of File
- New Metadata Assigned to File
- Transfer Access/Control to New Blockchain Participant
- New/Existing/Change of Ownership of the File

FIG. 6D

AUTOMATED STORAGE SELECTION WITH BLOCKCHAIN AND NLP

BACKGROUND

The present disclosure relates generally to the field of cloud storage, and more specifically to utilizing blockchain to obtain an optimal cloud storage service.

Cloud storage utilizes remote centralized storage systems that are typically operated by a third-party to store information on behalf of a user. Further, blockchain utilizes decentralized, immutable storage that promotes transparency of transactions between users and/or users and third-parties.

SUMMARY

Embodiments of the present disclosure include a method, system, and computer program product for smart cloud object storage management. A processor may receive a request for storage in a blockchain network. The request may include information as to a specific storage that is required. The processor may commit the request to the blockchain network. The processor may provide the request to one or more proposing entities. The processor may receive, from the one or more proposing entities, respective proposals in response to the request for storage. The processor may determine which of the respective proposals best match the information included in the request. The processor may automatically accept the best matched proposal.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

FIG. 6D illustrates a block which may represent the structure of blocks in the blockchain, in accordance with embodiments of the present disclosure.

Figure 1A:
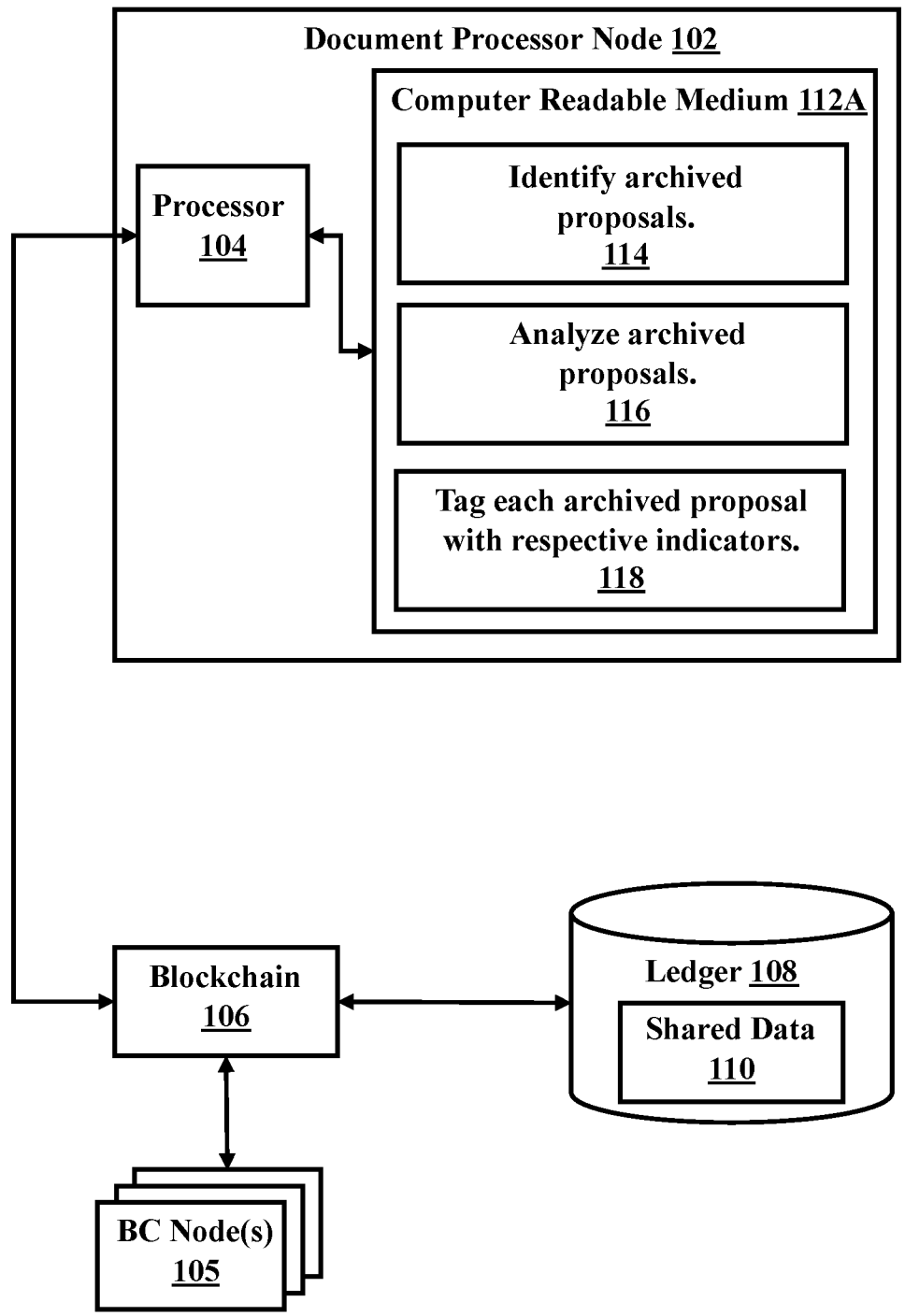
FIG. 1A illustrates a network diagram of a system including a database, according to an example embodiment.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of cloud storage, and more specifically to utilizing blockchain to obtain an optimal cloud storage service. It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined or removed in any suitable manner in one or more embodiments. Further, in the diagrams, any connection between elements can permit one-way and/or two-way communication even if the depicted connection is a one-way or two-way arrow. Also, any device depicted in the drawings can be a different device. For example, if a mobile device is shown sending information, a wired device could also be used to send the information.

In addition, while the term "message" may have been used in the description of embodiments, the application may be applied to many types of networks and data. Furthermore, while certain types of connections, messages, and signaling may be depicted in exemplary embodiments, the application is not limited to a certain type of connection, message, and signaling.

Example embodiments provide methods, systems, components, non-transitory computer readable media, devices, and/or networks, which provide for a privacy-preserving attribute-based document sharing in blockchain networks.

In one embodiment the application utilizes a decentralized database (such as a blockchain) that is a distributed storage system, which includes multiple nodes that communicate with each other. The decentralized database includes an append-only immutable data structure resembling a distributed ledger capable of maintaining records between mutually untrusted parties. The untrusted parties are referred to herein as peers or peer nodes. Each peer maintains a copy of the database records and no single peer can modify the database records without a consensus being reached among the distributed peers. For example, the peers may execute a consensus protocol to validate blockchain storage transactions, group the storage transactions into blocks, and build a hash chain over the blocks. This process forms the ledger by ordering the storage transactions, as is necessary, for consistency. In various embodiments, a permissioned and/or a permissionless blockchain can be used. In a public or permission-less blockchain, anyone can participate without a specific identity. Public blockchains can involve native cryptocurrency and use consensus based on various protocols such as Proof of Work. On the other hand, a permissioned blockchain database provides secure interactions among a group of entities which share a common goal but which do not fully trust one another, such as businesses that exchange funds, goods, information, and the like.

This application can utilize a blockchain that operates arbitrary, programmable logic, tailored to a decentralized storage scheme and referred to as "smart contracts" or "chaincodes." In some cases, specialized chaincodes may exist for management functions and parameters which are referred to as system chaincode. The application can further utilize smart contracts that are trusted distributed applications which leverage tamper-proof properties of the blockchain database and an underlying agreement between nodes, which is referred to as an endorsement or endorsement policy. Blockchain transactions associated with this application can be "endorsed" before being committed to the blockchain while transactions, which are not endorsed, are disregarded. An endorsement policy allows chaincode to specify endorsers for a transaction in the form of a set of peer nodes that are necessary for endorsement. When a client sends the transaction to the peers specified in the endorsement policy, the transaction is executed to validate the transaction. After validation, the transactions enter an ordering phase in which a consensus protocol is used to produce an ordered sequence of endorsed transactions grouped into blocks.

This application can utilize nodes that are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

This application can utilize a ledger that is a sequenced, tamper-resistant record of all state transitions of a blockchain. State transitions may result from chaincode invocations (e.g., transactions) submitted by participating parties (e.g., client nodes, ordering nodes, endorser nodes, peer nodes, etc.). Each participating party (such as a peer node) can maintain a copy of the ledger. A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain.

This application can utilize a chain that is a transaction log that is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (e.g., local, attached storage, cloud, etc.), efficiently supporting the append-only nature of the blockchain workload.

The current state of the immutable ledger represents the latest values for all keys that are included in the chain transaction log. Since the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

Some benefits of the instant solutions described and depicted herein include a method and system for a privacy-preserving attribute-based document sharing in blockchain networks in blockchain networks. The exemplary embodiments solve the issues of time and trust by extending features of a database such as immutability, digital signatures and being a single source of truth. The exemplary embodiments provide a solution for a privacy-preserving attribute-based document sharing in blockchain networks in blockchain-based network. The blockchain networks may be homogenous based on the asset type and rules that govern the assets based on the smart contracts.

Blockchain is different from a traditional database in that blockchain is not a central storage, but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like, which are further described herein. According to various aspects, the system for a privacy-preserving attribute-based document sharing in blockchain networks in blockchain networks is implemented due to immutable accountability, security, privacy, permitted decentralization, availability of smart contracts, endorsements and accessibility that are inherent and unique to blockchain. In particular, the blockchain ledger data is immutable and that provides for efficient method for a privacy-preserving attribute-based document sharing in blockchain networks in blockchain networks. Also, use of the encryption in the blockchain provides security and builds trust. The smart contract manages the state of the asset to complete the life-cycle. The example blockchains are permission decentralized. Thus, each end user may have its own ledger copy to access. Multiple organizations (and peers) may be on-boarded on the blockchain network. The key organizations may serve as endorsing peers to validate the smart contract execution results, read-set and write-set. In other words, the blockchain inherent features provide for efficient implementation of a method for smart cloud object storage management.

One of the benefits of the example embodiments is that it improves the functionality of a computing system by implementing a method for smart cloud object storage management in blockchain-based systems. Through the blockchain system described herein, a computing system (or a processor in the computing system) can perform functionality for smart cloud object storage management utilizing blockchain networks by providing access to capabilities such as distributed ledger, peers, encryption technologies, MSP, event handling, etc. Also, the blockchain enables to create a business network and make any users or organizations to on-board for participation. As such, the blockchain is not just a database. The blockchain comes with capabilities to create a business network of users and on-board/off-board organizations to collaborate and execute service processes in the form of smart contracts. For instance, and described in further detail throughout this disclosure, a smart contract can be automatically generated and accepted on behalf of a user if a cloud service provide offers a better storage incentive (e.g., more storage, lower costs, etc.) than the user's current cloud service provide.

The example embodiments provide numerous benefits over a traditional database. For example, through the blockchain the embodiments provide for immutable accountability, security, privacy, permitted decentralization, availability of smart contracts, endorsements and accessibility that are inherent and unique to the blockchain.

Meanwhile, a traditional database could not be used to implement the example embodiments because it does not bring all parties on the business network, it does not create trusted collaboration and does not provide for an efficient storage of digital assets. The traditional database does not provide for a tamper proof storage and does not provide for preservation of the digital assets being stored. Thus, the proposed method for smart cloud object storage management utilizing blockchain networks cannot be implemented in the traditional database.

Meanwhile, if a traditional database were to be used to implement the example embodiments, the example embodiments would have suffered from unnecessary drawbacks such as lack of security and slow speed of transactions. Accordingly, the example embodiments provide for a specific solution to a problem in the arts/field of cloud storage management.

The example embodiments also change how data may be stored within a block structure of the blockchain. For example, a digital asset data may be securely stored within a certain portion of the data block (e.g., within header, data segment, or metadata). By storing the digital asset data within data blocks of a blockchain, the digital asset data may be appended to an immutable blockchain ledger through a hash-linked chain of blocks. In some embodiments, the data block may be different than a traditional data block by having a personal data associated with the digital asset not stored together with the assets within a traditional block structure of a blockchain. By removing the personal data associated with the digital asset, the blockchain can provide the benefit of anonymity based on immutable accountability and security.

Continuing, a blockchain document processor may have two components: a private off-chain processor that manages secure processing of private information related to a participant; and a ledger processor that manages processing of common information shared with all participants of a blockchain network using the consensus algorithm of the network.

According to the exemplary embodiments, each of the organizations that intend to share documents with other organizations uses a blockchain document processor connected to a blockchain network. Using the document processor, the organizations may set up the following on the ledger: a list of document templates (such as archived cloud storage proposals, etc.); attributes of each document template that will be shared in hashed form on the ledger; a combination of key attributes from different templates for matching and sharing documents; and partnership Merkle trees: each partnership Merkle tree may be built based on partnering organizations' (e.g., proposing entities') identifiers (IDs).

In some embodiments, all documents (e.g., files, etc.) are stored on the off-chain data store (e.g., the cloud server, datacenter, etc.). Only the attribute hashes and the document identifier (ID) are submitted as a part of a blockchain transaction. For example, as proposed in the present disclosure, a user is currently storing their desired information on cloud systems provided by a cloud storage provider. Utilizing a blockchain application programming interface that references the documents a new smart contract with a new cloud service provider may be established between said new cloud service provider and the user and the referenced documents can be transferred, off-chain, to the new cloud storage system.

Referring now to FIG. 1A, illustrated is a logic network diagram for smart cloud object storage management utilizing blockchain networks, in accordance with embodiments of the present disclosure.

As to FIG. 1A, an example network 100 includes a document processor node 102 connected to other blockchain (BC) nodes 105 representing document owner organizations (e.g., users, cloud service providers, etc.). The document processor node 102 may be connected to a blockchain 106 that has a ledger 108 for storing data to be shared (110) among the nodes 105. While this example describes in detail only one document processor node 102, multiple such nodes may be connected to the blockchain 106. It should be understood that the document processor node 102 may include additional components and that some of the components described herein may be removed and/or modified without departing from a scope of the document processor node 102 disclosed herein. The document processor node 102 may be a computing device or a server computer, or the like, and may include a processor 104, which may be a semiconductor-based microprocessor, a central processing unit (CPU), an application specific integrated circuit (ASIC), a field-programmable gate array (FPGA), and/or another hardware device. Although a single processor 104 is depicted, it should be understood that the document processor node 102 may include multiple processors, multiple cores, or the like, without departing from the scope of the document processor node 102 system. In some embodiments, the document processor node 102 may itself be a BC node 105 and may incorporate natural language processing functions (to be discussed more fully in regard to FIG. 3B) in order to analyze received documents.

Further, the document processor node 102 may also include a non-transitory computer readable medium 112A that may have stored thereon machine-readable instructions executable by the processor 104. Examples of the machine-readable instructions are shown as 114-118 and are further discussed below. Examples of the non-transitory computer readable medium 112A may include an electronic, magnetic, optical, or other physical storage device that contains or stores executable instructions. For example, the non-transitory computer readable medium 112A may be a Random Access memory (RAM), an Electrically Erasable Programmable Read-Only Memory (EEPROM), a hard disk, an optical disc, or other type of storage device.

The processor 104 may execute the machine-readable instructions 114 to identify one or more archived proposals. In some embodiments, the one or more archived proposals are smart contracts between one or more cloud service providers and one or more users. The smart contracts may detail the service requirements (e.g., storage size, processing power, etc.) being provided by the cloud service provider and/or the compensation provided by the user. In some embodiments, the proposals may be offers extended by the cloud service provider that were not accepted by a user.

As discussed above, the blockchain ledger 108 may store data to be shared among the nodes 105. The blockchain 106 network may be configured to use one or more smart contracts that manage transactions for multiple participating nodes. The processor 104 may execute the machine-readable instructions 116 to analyze the archived proposals. In such an embodiment, each of the other cloud service providers in the blockchain 106 may readily identify the shortfalls of the proposals and adjust their respective proposals to retain more users. In some embodiments, a neural network and/or any form of machine-learning may be utilized by the cloud service providers to analyze the smart contracts and/or offers to find correlations and augment/adjust their subsequent offers for users.

The processor 104 may execute the machine-readable instructions 118 to tag each archived proposal with respective indicators. For example, the processor 104 may tag each archived proposal based on the amount of storage size a user requested and/or how long, timewise, storage is needed, etc. In such an embodiment, a cloud service/storage provider may readily implement any machine-learning functionalities to easily search through the archived proposals in order to establish unknown correlations and/or determine industry averages.

Figure 1B:
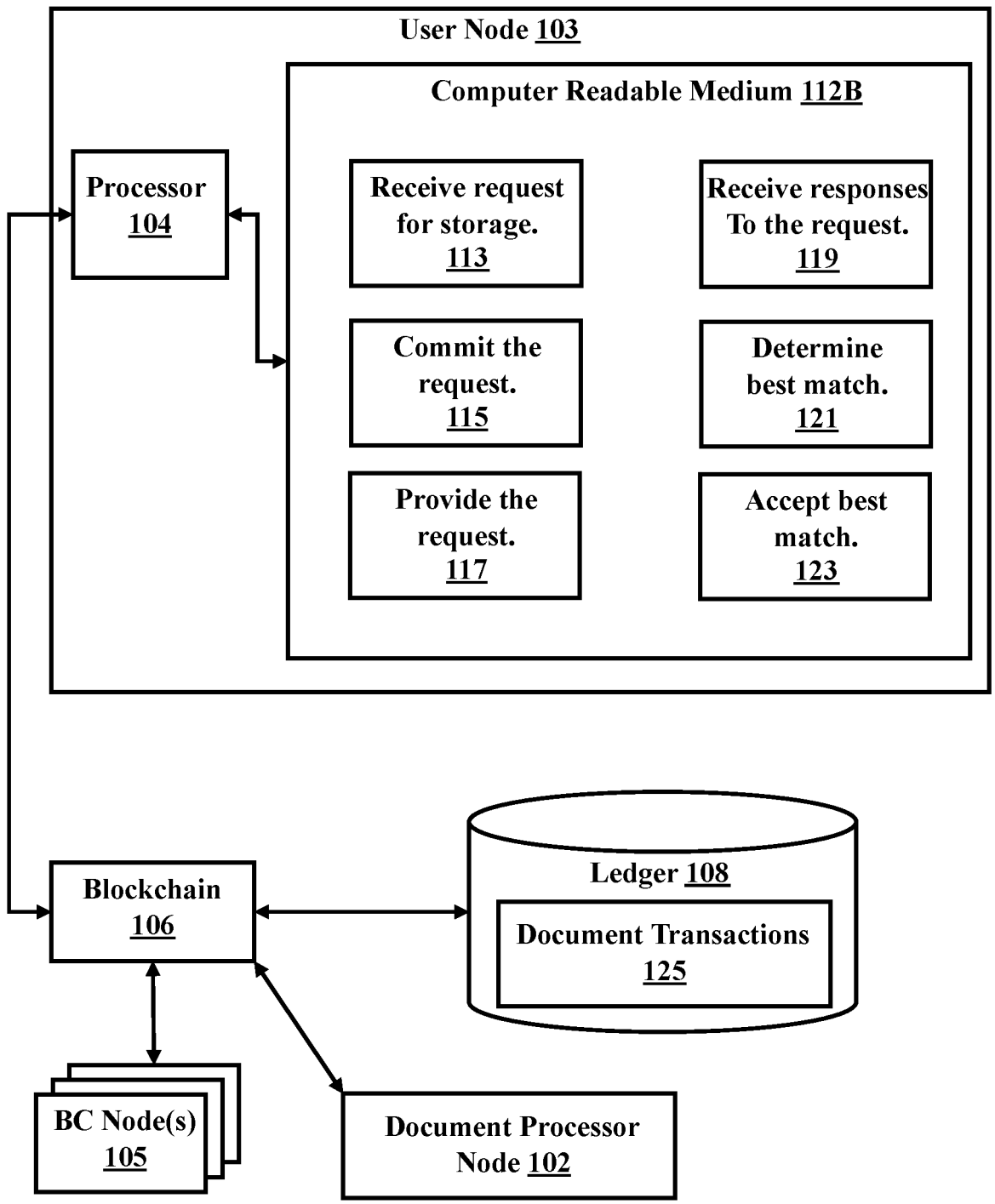
FIG. 1B illustrates a network diagram of a system including a database, according to another example embodiment.

FIG. 1B further illustrates a logic network diagram for smart cloud object storage management utilizing blockchain networks, in accordance with embodiments of the present disclosure.

In regard to FIG. 1B, the example network 130 includes a user node 103 connected to other blockchain (BC) nodes 105 (e.g., document owner nodes) and to the document processor node 102 of FIG. 1A, which, in some embodiments is now acting as a recommender/recommending node that will be discussed more fully in regard to FIG. 3A. The user node 103 may be connected to a blockchain 106 that has a ledger 108 for storing document-related transactions 125. While this example describes in detail only one user node 103, multiple such nodes may be connected to the blockchain 106. It should be understood that the user node 103 may include additional components and that some of the components described herein may be removed and/or modified without departing from a scope of the user node 103 disclosed herein. The user node 103 may be a computing device or a server computer, or the like, and may include a processor 104, which may be a semiconductor-based microprocessor, a central processing unit (CPU), an application specific integrated circuit (ASIC), a field-programmable gate array (FPGA), and/or another hardware device. Although a single processor 104 is depicted, it should be understood that the user node 103 may include multiple processors, multiple cores, or the like, without departing from the scope of the user node 103 system.

The user node 103 may also include a non-transitory computer readable medium 112B that may have stored thereon machine-readable instructions executable by the processor 104. Examples of the machine-readable instructions are shown as 113-123 and are further discussed below. Examples of the non-transitory computer readable medium 112B may include an electronic, magnetic, optical, or other physical storage device that contains or stores executable instructions. For example, the non-transitory computer readable medium 112B may be a Random Access memory (RAM), an Electrically Erasable Programmable Read-Only Memory (EEPROM), a hard disk, an optical disc, or other type of storage device.

The processor 104 may execute the machine-readable instructions 113 to receive a request for storage in the blockchain 106 (e.g., blockchain network). In some embodiments, the request includes information as to a specific storage (e.g., size requirements, etc.) that is required (e.g., by the user, for data to be stored, etc.). The processor 104 may execute the machine-readable instructions 115 to commit the request to the blockchain 106.

The processor 104 may execute the machine-readable instructions 117 to provide the request to one or more proposing entities (e.g., cloud service/storage providers) through the blockchain 106 and which may respectively utilize the BC nodes 105.

The processor 104 may execute the machine-readable instructions 119 to receive, from the one or more proposing entities, respective proposals in response to the request for storage. The respective proposals may be received over/via the blockchain 106. In some embodiments, the respective proposals may be sent to the ledger 108 as shared data 110 and/or may be used by the document processor node 102 to be utilized in determining proposals for a subsequent request by a user.

The processor 104 may execute the machine-readable instructions 121 to determine which of the respective proposals best match the information included in the request. In some embodiments, each of the respective proposals may be analyzed by the document processor node 102 to identify proposal information (e.g., how much storage for how long and at what cost to the user).

The processor 104 may execute the machine-readable instructions 123 to automatically accept the best match proposal. In some embodiments, automatically accepting the best matched proposal further automatically generates a smart contract between the user who sent the request and the entity associated with the best matched proposal. In such an embodiment, the smart contract and/or the (terms of the) best matched proposal may be sent to the ledger 108 as a part of the document transactions 125.

In some embodiments, the processor 104 may execute further machine-readable instructions not present in FIG. 1A, but which are discussed below. For example, the processor 104 may a utilize natural language processing technique to analyze the respective proposals and compare the analyzed respective proposals to the information included in the request. In some embodiments, the processor 104 may utilize the document processor node 102 to perform the natural language processing technique.

In some embodiments, the processor 104 may transition one or more nodes in the blockchain network into recommendation nodes. The recommendation nodes may incorporate the natural language processing technique. The processor 104 may communicate the recommendation nodes with one or more endorsing nodes in the blockchain network. The one or more endorsing nodes may utilize respective recommendations from the recommendation nodes to further assist in determining the best matched proposal. In some embodiments, the recommendation nodes may collaborate together and send a single recommendation to the one or more endorsing nodes.

In some embodiments, the processor 104 may store the best matched proposal in the blockchain network. The processor 104 may identify that a second request for storage in the blockchain network has been received. the processor 104 may determining, utilizing the recommendation nodes, that the second request is within a threshold limit of the request (e.g., that the second request is substantially the same as the request, 90% similar to the request, etc.). The processor 104 may accept, automatically, the best matched proposal for the second request.

In some embodiments, the processor 104 may add the best matched proposal to the blockchain network. The processor 104 may display the best matched proposal to each of the one or more proposing entities. The processor 104 may provide the one or more proposing entities with an option to adapt their respective proposals to the best matched proposal (e.g., any proposing entity may change their proposal based on the information included in the best matched proposal.

It is noted, that in some embodiments, the request may further include a compliance requirement for storage. The compliance requirement may indicate one or more necessities for storage (e.g., type of storage, size of storage, etc.). In some embodiments, the request may further include a size of storage needed and a number of replicas to be stored in the storage.

Figure 2A:
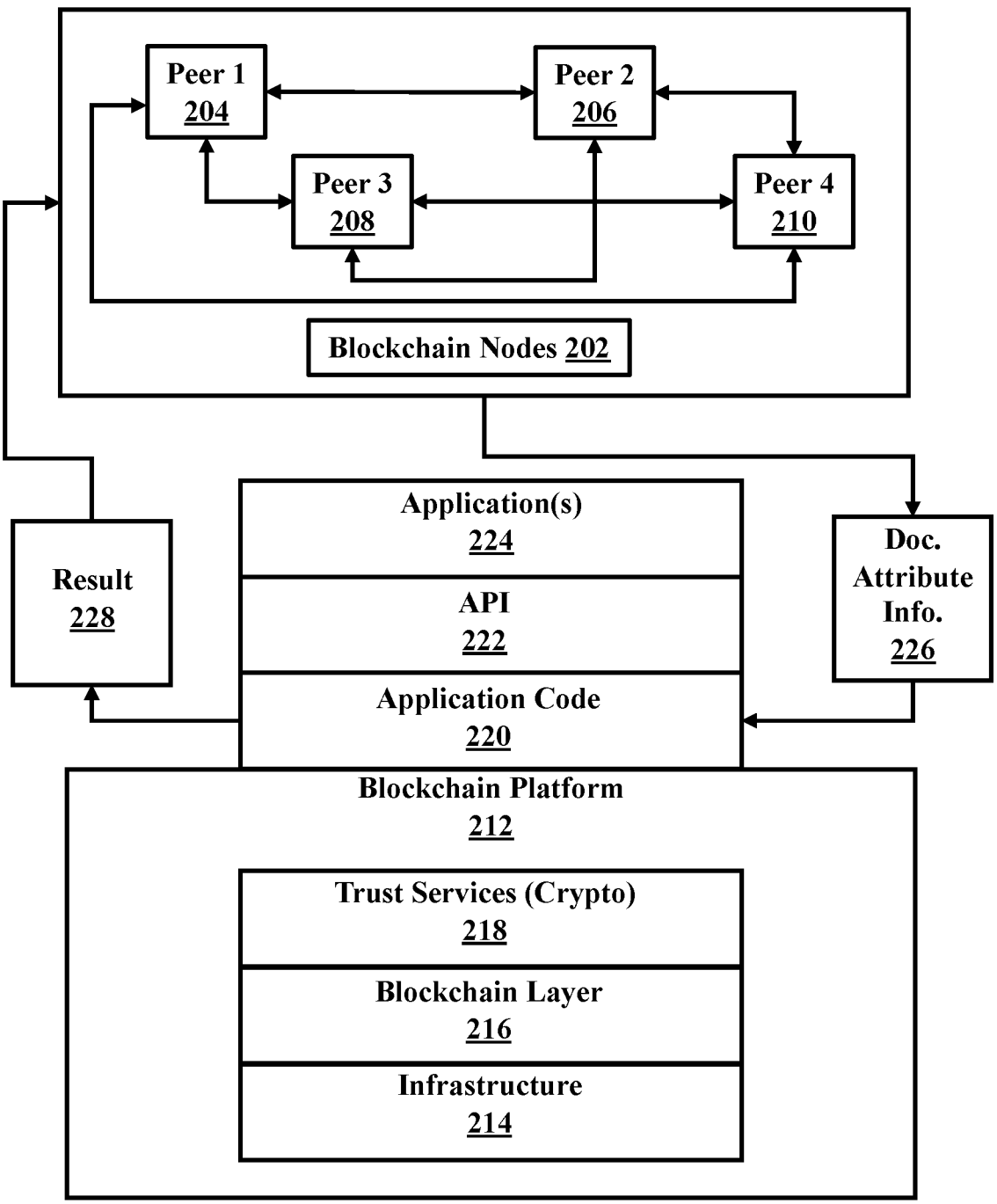
FIG. 2A illustrates an example blockchain architecture configuration, in accordance with embodiments of the present disclosure.

FIG. 2A illustrates a blockchain architecture configuration 200, in accordance with embodiments of the present disclosure. Referring to FIG. 2A, the blockchain architecture 200 may include certain blockchain elements, for example, a group of blockchain nodes 202. The blockchain nodes 202 may include one or more nodes 204-210 (these four nodes are depicted by example only). These nodes participate in a number of activities, such as blockchain transaction addition and validation process (consensus). One or more of the blockchain nodes 204-210 may endorse and/or recommend transactions based on an endorsement policy and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or more applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute the generation of storage spaces, the reserving of storage spaces, updates to current proposals, etc. The smart contracts can themselves be used to identify rules associated with authorization and access requirements and usage of the ledger. For example, the document attribute(s) information 226 may be processed by one or more processing entities (e.g., virtual machines) included in the blockchain layer 216. The result 228 may include a plurality of linked shared documents (e.g., with each linked shared document recording the issuance of a smart contract, etc.). The physical infrastructure 214 may be utilized to retrieve any of the data or information described herein.

A smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details (e.g., thus establishing a new smart contract between a user and a proposing entity with a best matched proposal).

Figure 2B:
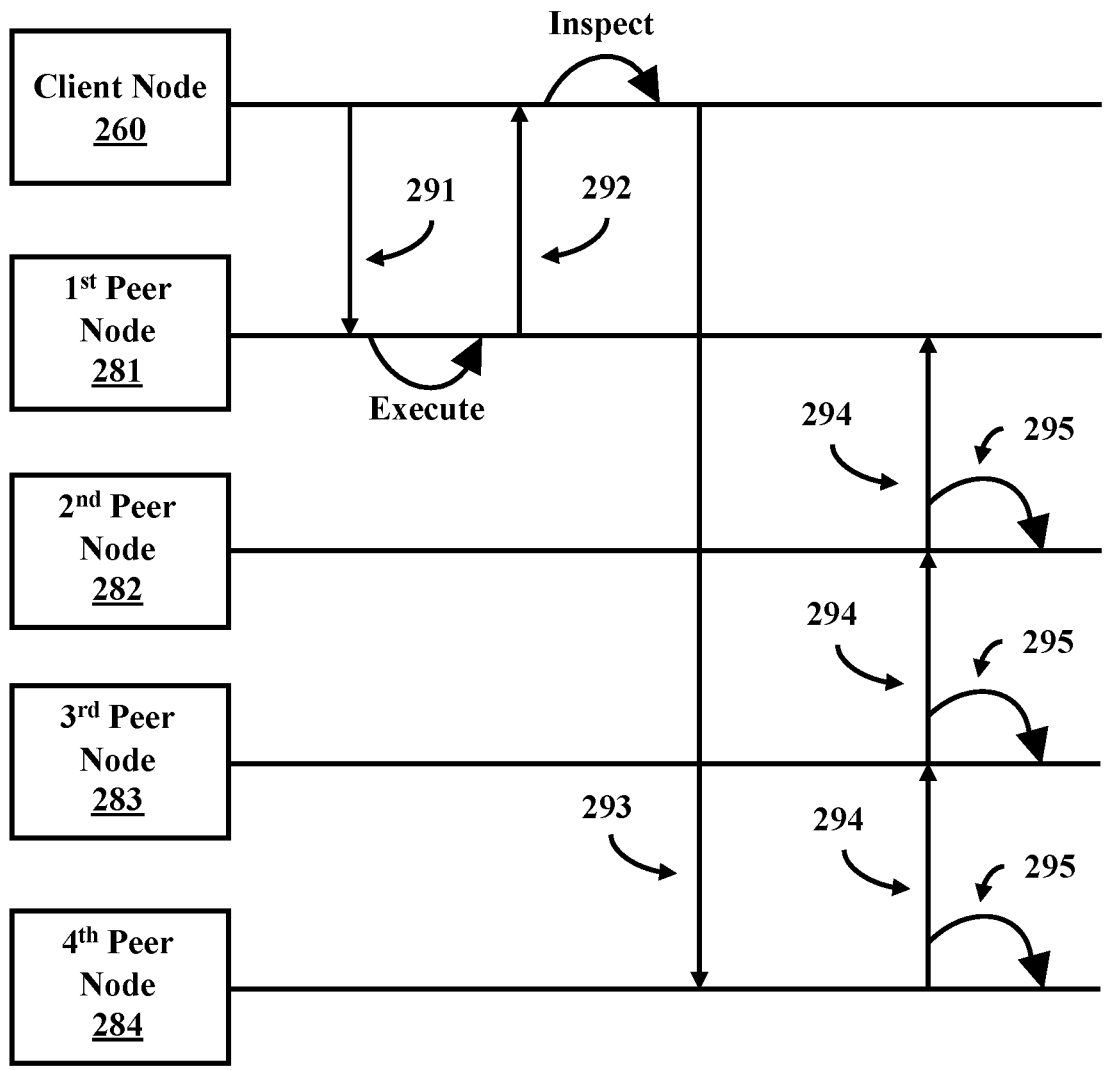
FIG. 2B illustrates a blockchain transactional flow, in accordance with embodiments of the present disclosure.

FIG. 2B illustrates an example of a blockchain transactional flow 250 between nodes of the blockchain in accordance with an example embodiment. Referring to FIG. 2B, the transaction flow may include a transaction proposal 291 sent by an application client node 260 to an endorsing peer node 281 (e.g., in some embodiments, the transaction proposal 291 may be sent for endorsement upon determining a proposal is a best matched proposal in regard to a request). The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

Referring again to FIG. 2B, the client node 260 initiates the transaction 291 by constructing and sending a request to the peer node 281, which is an endorser. The client 260 may include an application leveraging a supported software development kit (SDK), which utilizes an available API to generate a transaction proposal. The proposal is a request to invoke a chaincode function so that data can be read and/or written to the ledger (e.g., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 260 which parses the payload for the application to consume.

In response, the application of the client 260 inspects/verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (e.g., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase. In some embodiments, it is noted, that each client may additionally have their own recommender/recommending node (to be more fully discussed in regard to FIG. 3A), which may recommend which transaction (proposal) for an endorsing node to endorse.

After successful inspection, in step 293 the client 260 assembles endorsements into a transaction and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3A:
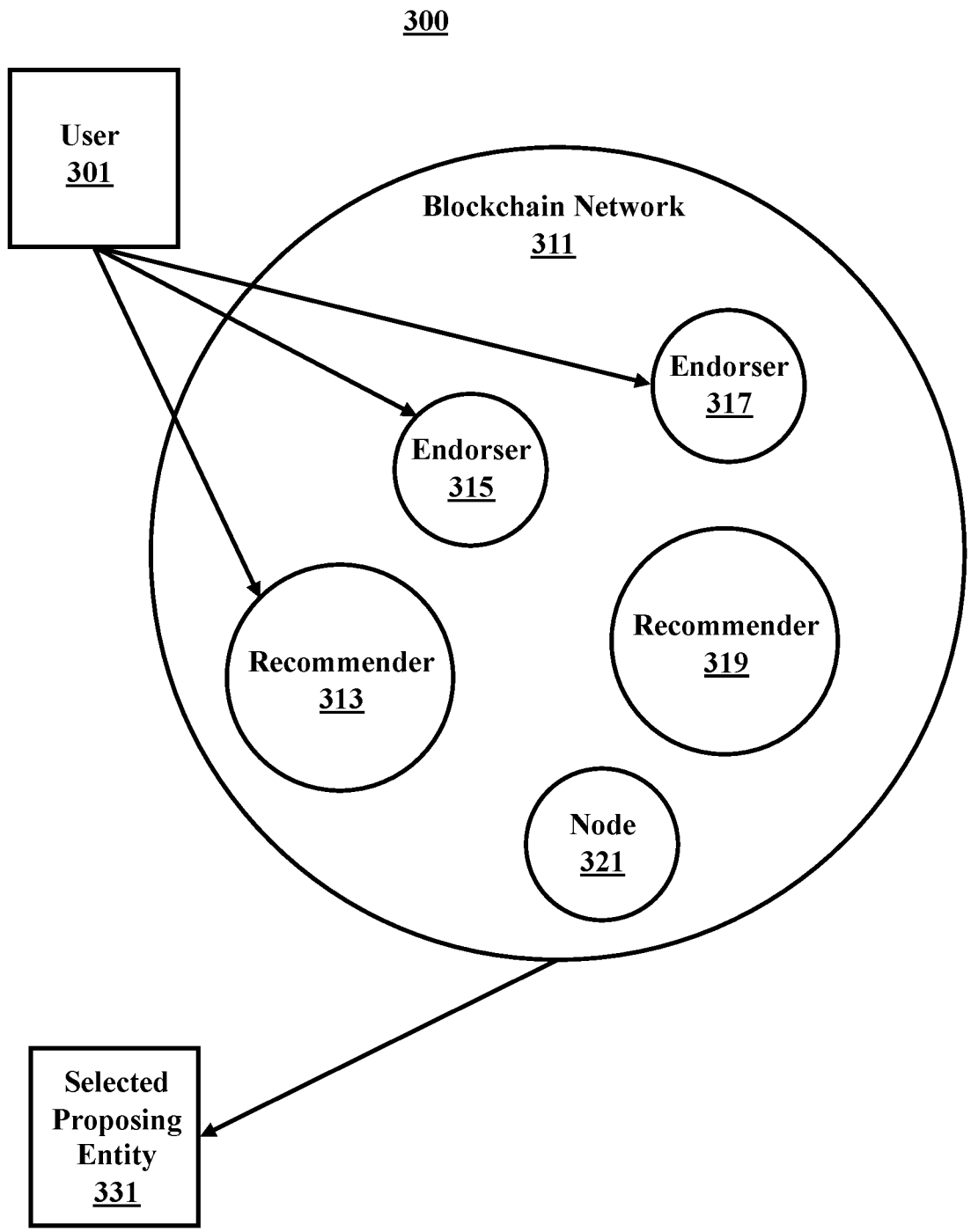
FIG. 3A illustrates an example system for automatically establishing a smart contract, in accordance with embodiments of the present disclosure.

FIG. 3A illustrates an example system 300 for automatically establishing a smart contract, in accordance with embodiments of the present disclosure. In some embodiments, the system 300 includes a user 301, a blockchain network 311, and a selected proposing entity 331. The blockchain network 311 may be the blockchain 106 of FIGS. 1A and 1B and may include multiple nodes 313, 315, 317, 319, and 321, which may parallelly communicate with one another and keep copies of processed transactions/information. The multiple nodes 313, 315, 317, 319, and 321, as depicted, are represented as specialized nodes: recommender 313, 319; endorser 315, 317; and miscellaneous (peer) node 321. However, it should be known that any of the nodes 313, 315, 317, 319, and 321 could perform any function described herein.

In some embodiments, the user 301 sends a request for storage and/or the system 300 requests proposals, at specific time intervals (e.g., every week, month, etc.) from entities utilizing the blockchain network 311 that provide storage solutions (in such an embodiment, the user is constantly provided the most up-to-date and most cost efficient storage solution). Upon receiving the request, the blockchain network 311 disperses the request to the recommender 313 and the endorsers 315, 317. The recommender 313 may utilize natural language processing techniques to analyze the request for specific information regarding storage needs and for analyzing any proposals in response to the request that are provide by entities utilizing the blockchain network 311.

The recommender 313 may additionally compare requests and proposals and provide an assessment as to how closely related the request and each respective proposal are (e.g., one proposal provides 95% of what the user is requesting in the request, etc.). The recommender 313 may then provide the endorsers 315, 317 the proposal that best matches the request. The endorsers 315, 317 may then endorse the best match proposal and process/execute a smart contract between the user 301 and the selected proposing entity 331 (which is associated with the best matched proposal). It is noted that the recommender 319 and the miscellaneous node 321 were not used in the description of FIG. 3A, but were illustrated to show that the blockchain network 311 has more than the utilized nodes and that any of the nodes 313, 315, 317, 319, and 321 could be used.

Further explaining how the recommenders 313, 319 are generated and are employed, the recommenders 313, 319 make use of natural language processing rules/techniques to generate recommendations based on information/policies stored in a ledger, such as the ledger 108 of FIGS. 1A and 1B. Such recommendations may be taken into account by endorsers 315, 317 to execute the procedures needed (e.g., execution of a smart contract, validations, authorizations, etc.).

In some embodiments, recommenders 313, 319 can select a storage provider to be used by the user 301 based on a new by the user 301 request and any received proposals. In such an embodiment, the user 301 is not currently associated with any storage provider and a storage provider may be automatically selected for the user based on the request and the best matched proposal (e.g., select service is provided by the described system 300).

In some embodiments, the recommenders 313, 319 can select a new storage provider or update a current storage subscription based on the request, historical transactions, current offerings and user needs (e.g., offering service is provided by the described system 300 to provide a user with the best offer related to their storage needs). Upon the recommenders 313, 319 determining a (new) storage provider, the endorsers 315, 317 request the migration of information associated with the user 301, and stored by (a first) storage provider, to the (new/second) storage provider, or, additional storage is purchased from the (first) storage provider that is currently being used by the user 301 (if the current storage provider still has the best matched proposal).

It is noted that the recommenders 313, 319 are a part of the blockchain network 311 because the recommenders 313, 319 may require a copy of the ledger or a partial ledger as it is generated in order to execute the recommendations. In some embodiments, the recommenders 313, 319 may be generated from any node in the a blockchain network, e.g., the recommenders 313, 319 may be transitioned from the endorsers 315, 317 or miscellaneous node 321. Further, the recommenders 313, 319 are a part of the blockchain network 311 to be considered as part of endorsement policies and/or in order to provide their recommendations to the other proposing entities that were not associated with a recommended/best matched proposal (e.g., allowing the other proposing entities to adapt their proposals).

Figure 3B:
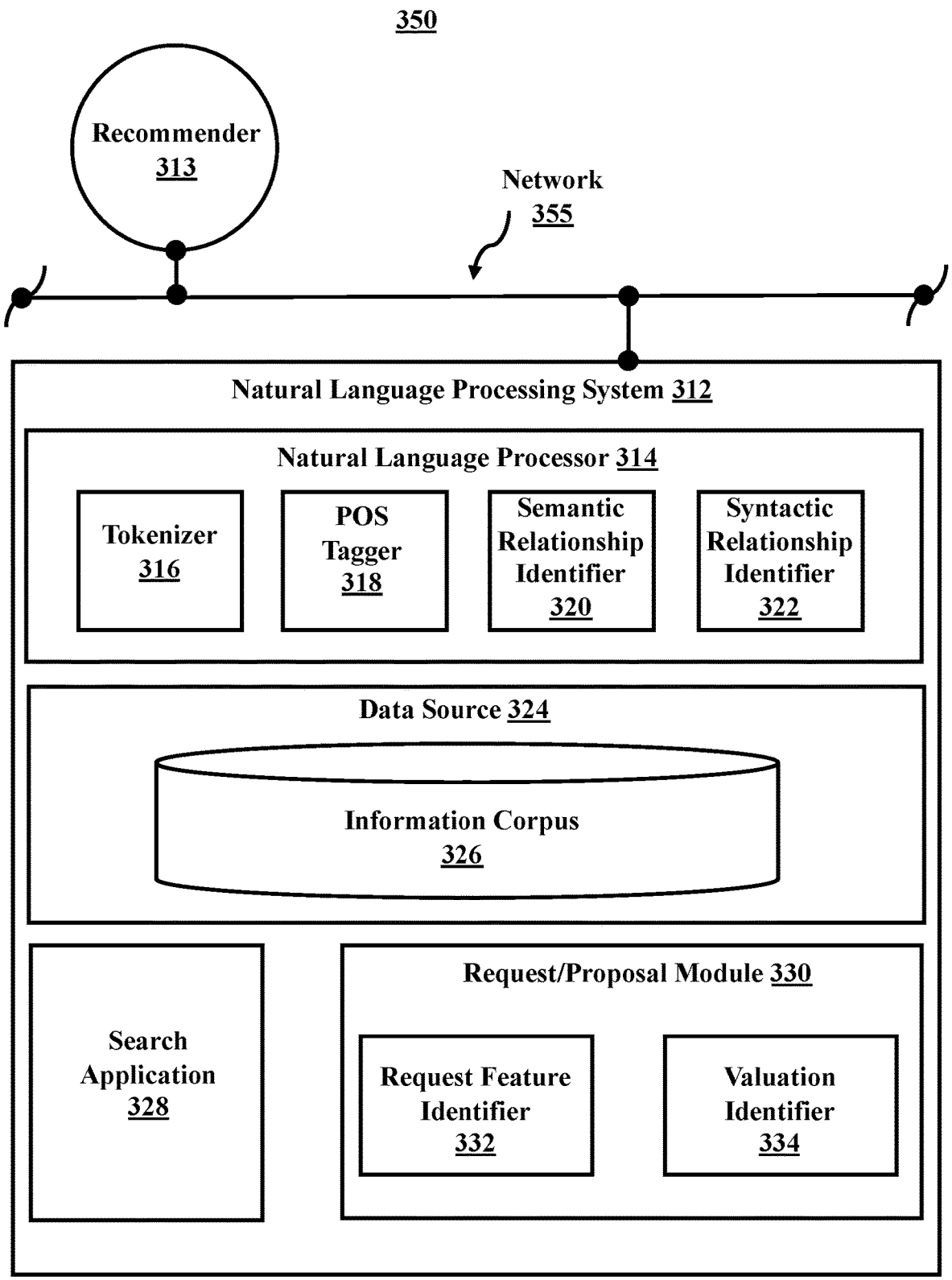
FIG. 3B illustrates a block diagram of an example natural language processing system configured to analyze a request, in accordance with embodiments of the present disclosure.

FIG. 3B illustrates a block diagram of an exemplary system architecture 350, including a natural language processing system 312, configured to analyze request/proposal data to identify a storage requirements and storages costs, in accordance with embodiments of the present disclosure. In some embodiments, a remote device may submit a request and/or a proposal to be analyzed to the natural language processing system 312 that may be housed on a host device. Such a remote device may include the recommender 313 of FIG. 3A, which may itself utilize one or more services (e.g., the blockchain network 311, etc.) operable to generate or modify information associated with the request and/or proposal(s) that is then dispatched to a natural language processing system 312 via a network 355. It is noted that the network 355 may be a cloud network so as to reduce a computational cost associated with the blockchain network 311.

In some embodiments, the natural language processing system 312 may be housed within the recommender 313 such that the blockchain network 311 further includes the natural language processing system 312. In other embodiments, the recommender 313 may access and utilize the natural language processing system 312 on a cloud network one or more times in order to generate a natural language model and after a threshold number of iterations when the blockchain network 311 determines that the recommender 313 is trained, the recommender 313 may stop using the natural language processing system 312 and begin utilizing its own natural language model for subsequent requests/proposals. It is noted that although the recommender 313 is depicted in FIG. 3B, that any recommender node may utilize the natural language processing system 312 and perform the techniques discussed herein.

Consistent with various embodiments, the natural language processing system 312 may respond to query and recording submissions sent by the recommender 313. Specifically, the natural language processing system 312 may analyze a received request and/or proposals r to identify a particular subject/requirements in the request/proposals. In some embodiments, the natural language processing system 312 may include a natural language processor 314, data sources 324, a search application 328, and a request/proposal module 330. The natural language processor 314 may be a computer module that analyzes the request and the proposal(s). The natural language processor 314 may perform various methods and techniques for analyzing requests and/or proposals (e.g., syntactic analysis, semantic analysis, etc.). The natural language processor 314 may be configured to recognize and analyze any number of natural languages.

In some embodiments, the natural language processor 314 may group one or more sections of a request and/or proposal(s) into one or more subdivisions. Further, the natural language processor 314 may include various modules to perform analyses of request and/or proposal(s). These modules may include, but are not limited to, a tokenizer 316, a part-of-speech (POS) tagger 318 (e.g., which may tag each of the one or more subdivisions in which storage requirements and/or storage costs are identified), a semantic relationship identifier 320, and a syntactic relationship identifier 322.

In some embodiments, the tokenizer 316 may be a computer module that performs lexical analysis. The tokenizer 316 may convert a sequence of characters (e.g., images, sounds, etc.) into a sequence of tokens. A token may be a string of characters included in a request/proposal and categorized as a meaningful symbol. Further, in some embodiments, the tokenizer 316 may identify word boundaries in a request/proposal and break any text within the request/proposal into their component text elements, such as words, multiword tokens, numbers, and punctuation marks. In some embodiments, the tokenizer 316 may receive a string of characters, identify the lexemes in the string, and categorize them into tokens.

In some embodiments, in addition to the tokenizer 316 and/or separately from the tokenizer 316, the natural language processing system 312 may include a component that performs document to vector natural language processing functions. For example, a request and/or a proposal will be parsed into their component words and the words will subsequently be transformed into associated vectors that will then be used for natural language analysis.

Consistent with various embodiments, the POS tagger 318 may be a computer module that marks up a word in a recording to correspond to a particular part of speech. The POS tagger 318 may read a passage or other text in natural language and assign a part of speech to each word or other token. The POS tagger 318 may determine the part of speech to which a word corresponds based on the definition of the word and the context of the word. The context of a word may be based on its relationship with adjacent and related words in a phrase, sentence, or paragraph. In some embodiments, the context of a word may be dependent on one or more previously analyzed requests and/or proposal(s) (e.g., the content of one request may shed light on the meaning of one or more requirements in another request). Examples of parts of speech that may be assigned to words include, but are not limited to, nouns, verbs, adjectives, adverbs, and the like. Examples of other part of speech categories that POS tagger 318 may assign include, but are not limited to, comparative or superlative adverbs (e.g., a request stating that 1 terabyte of cloud storage is better than 2 terabytes for the user's storage purposes, etc.), wh-adverbs, conjunctions, determiners, negative particles, possessive markers, prepositions, wh-pronouns, and the like. In some embodiments, the POS tagger 318 may tag or otherwise annotate tokens of a recording with part of speech categories. In some embodiments, the POS tagger 318 may tag tokens or words of a recording to be parsed by the natural language processing system 312.

In some embodiments, the semantic relationship identifier 320 may be a computer module that may be configured to identify semantic relationships of recognized subjects (e.g., words, phrases, images, etc.) in a request/proposal. In some embodiments, the semantic relationship identifier 320 may determine functional dependencies between entities and other semantic relationships.

Consistent with various embodiments, the syntactic relationship identifier 322 may be a computer module that may be configured to identify syntactic relationships in a recording composed of tokens. The syntactic relationship identifier 322 may determine the grammatical structure of sentences such as, for example, which groups of words are associated as phrases and which word is the subject or object of a verb. The syntactic relationship identifier 322 may conform to formal grammar.

In some embodiments, the natural language processor 314 may be a computer module that may group sections of a request/proposal into subdivisions and generate corresponding data structures for one or more subdivisions of the request/proposal. For example, in response to receiving a request at the natural language processing system 312 via the recommender 313, the natural language processor 314 may output subdivisions of the request as data structures. In some embodiments, a subdivision may be represented in the form of a graph structure. To generate the subdivision, the natural language processor 314 may trigger computer modules 316-322.

In some embodiments, the output of natural language processor 314 may be used by search application 328 to perform a search of a set of (e.g., one or more) corpora to retrieve one or more subdivisions including a particular requirement associated with a request and send the output to an word processing system and to a comparator. As used herein, a corpus may refer to one or more data sources, such as the data sources 324. In some embodiments, the data sources 324 may include video libraries, data warehouses, information corpora, data models, and document repositories. In some embodiments, the data sources 324 may include an information corpus 326. The information corpus 326 may enable data storage and retrieval. In some embodiments, the information corpus 326 may be a subject repository that houses a standardized, consistent, clean, and integrated list of words, images, and dialogue. For example, the information corpus 326 may include verbal statements made by a storage provider representative (e.g., a phone message where a representative states that 1 terabyte of cloud storage can be provided by their storage provider). The data may be sourced from various operational systems. Data stored in the information corpus 326 may be structured in a way to specifically address reporting and analytic requirements. In some embodiments, the information corpus 326 may be a relational database.

In some embodiments, the request/proposal module 330 may be a computer module that identifies request (or proposal) features within sections of a request/proposal and then evaluates the similarities between the request and proposal. In some embodiments, the request/proposal module 330 may include a request feature identifier 332 and a valuation identifier 334. When a request is received by the natural language processing system 312, the request/proposal module 330 may be configured to analyze a request using natural language processing to identify a particular storage requirements and/or desires (e.g., storage must hold x amount of replicas and user would like the service to provide for x amount of time, etc.). In some embodiments, the request/proposal module 330 may first identity one or more requirements in the request using the natural language processor 314 and related subcomponents 316-322.

Further, in some embodiments, upon identification of the particular storage requirements, the request/proposal module 330 may analyze one or more proposals sent by storage entities in response to the request. This may be achieved by the recommender 313 providing the blockchain network 311 with the particular storage requirements and then forwarding proposals to the natural language processing system 312.

After identifying particular storage requirements of the request and/or proposals using the request feature identifier 332, the valuation identifier 334 may the compare each proposal to the request and rank each of the proposals based on how many of the requirements of the request are fulfilled by the proposals. The natural language processing system 312 may send the ranked listed generated by the valuation identifier 334 to the recommender 313. In some embodiments, the recommender 313 may take into account a cost associated with each proposal and then select a best matched proposal to recommend to endorsers 315, 317 in the blockchain network 311. For example, a first ranked proposal may meet 90% of the requirements asked for in a proposal, but the service provider may be asking for two-times the rate of the second ranked proposal, which may meet 87% of the requirements asked for in the proposal. Thus the recommender 313 may recommend the second ranked proposal (as ranked by the valuation identifier 334) to the endorsers 315, 317.

Figure 4:
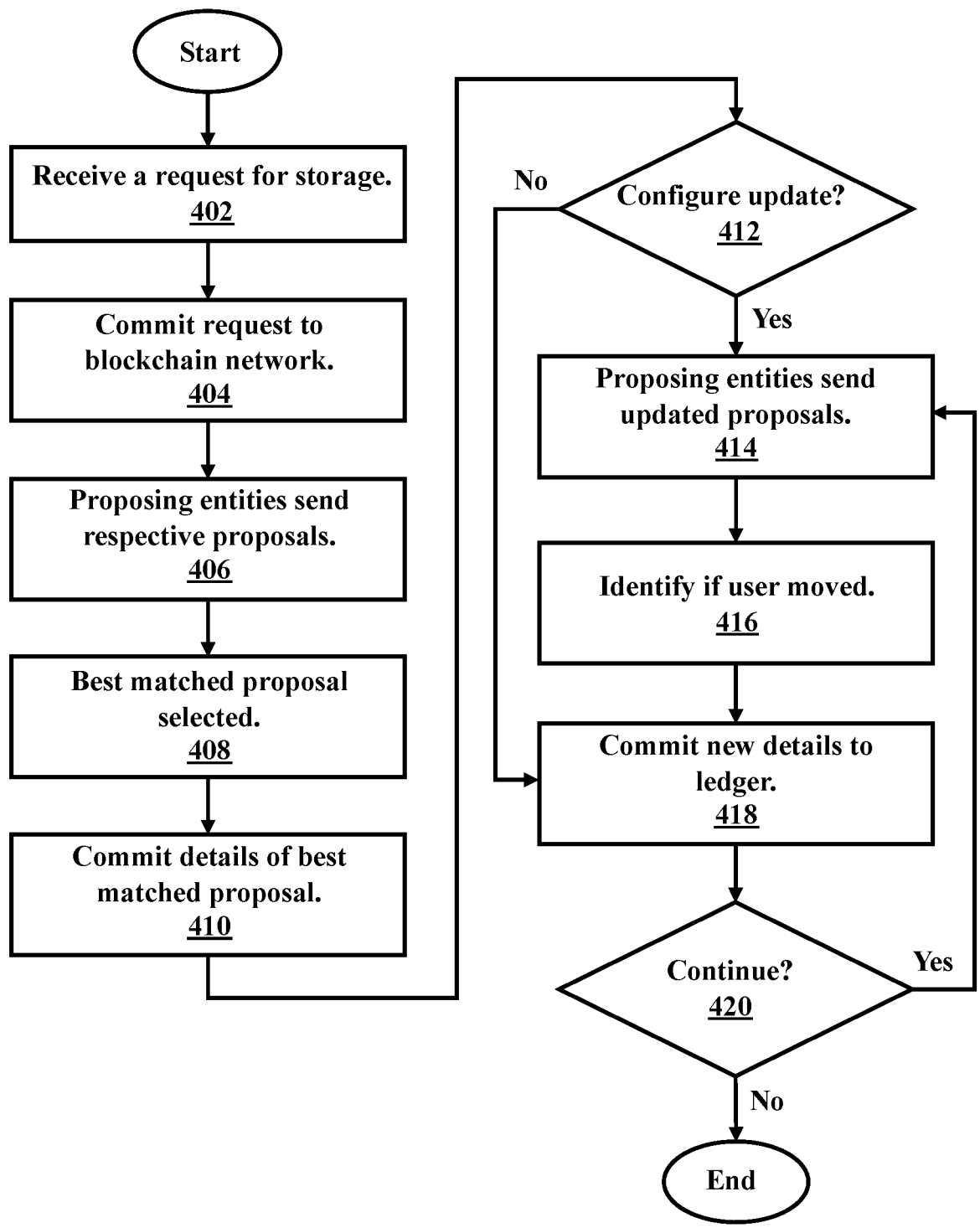
FIG. 4 illustrates a flow diagram of an example method for automatically accepting a best matched proposal, in accordance with embodiments of the present disclosure.

FIG. 4 illustrates a flow diagram of an example method 400 for automatically accepting a best matched proposal, in accordance with embodiments of the present disclosure. In some embodiments the method 400 may be performed by a processor. In some embodiments, the method 400 begins at operation 402, where the processor receives a request for storage in a blockchain network. The request includes information as to a specific storage that is required.

The method 400 proceeds to operation 404, where the processor commits the request to the blockchain network. The method 400 proceeds to operation 406. At operation 406, proposing entities sent respective proposals in response to the request committed to the blockchain network For example, cloud providers that are a part of the blockchain network send their best price for their storage services. In some embodiments the proposals may have already been vetted by a recommender to determine if the proposal falls within the requirements of the request.

The method 400 proceeds to operation 408, where the best matched proposal is selected. For example, a recommender may analyze each respective proposal and the request and select the best/optimal proposal for storage based on the request.

The method 400 proceeds to operation 410. At operation 410, the details of the best matched proposal are committed to all users and all cloud providers (e.g., allowing for transparency of which/why a proposal was selected over the other proposals). The method 400 proceeds to decision block 412 where it is determined whether or not a configuration to the respective proposals is made (e.g., each proposing entity not associated with the best matched proposal may update their proposals based on the committed details of the best matched proposal).

If, at decision block 412, it is identified that no proposing entities have, or will, update their respective proposals, the method 400 proceeds to operation 418, where the details of the best matched proposal is fully committed the a blockchain, immutable ledger.

If, at decision block 412, it is identified that one or more proposing entities have, or will, update their respective proposals, the method 400 proceeds to operation 414, where the proposing entities send their updated proposals (e.g., allowing for competition between cloud providers).

The method 400 proceeds to operation 416. At operation 416 it is identified whether the user is moved to a new cloud provider or not (e.g., the best matched proposal and/or one of the updated proposals may now be the best matched proposal and be associated with a cloud provider already being used by the user who submitted the request).

If, at operation 416, it is identified that the user has moved, or will be moved, to a new cloud provider, the method 400 proceeds to operation 418.

At operation 418, the new details of an updated best matched proposal are committed to the blockchain ledger and/or a smart contract between the cloud provider associated with the best matched proposal and the user associated with the request is generated.

The method 400 proceeds to decision block 420, where it is determined whether or not the method 400 should continue processing updated proposals from proposing entities. If, at decision block 420, it is determined that the method 400 should continue (e.g., a more optimal/better proposal can be obtained or is likely to be submitted/obtained, no more proposals are received from proposing entities, etc.), the method 400 repeats operations 414-418.

If, at decision block 420, it is determined that the method 400 should not continue (e.g., an optimal/best proposal is obtained, no more proposals are received from proposing entities, etc.), the method 400 ends.

Still referring to FIG. 4, described below is an example of how the method 400 can be implemented. For instances, a user sends a request for (cloud) storage, the request includes: a size of storage (e.g., GB, TB, etc.) that is desired, one or more compliance requirements for the storage, an amount of replicas needed in the storage, and/or a desired input/output (I/O) performance of the storage.

The information provided in the request (e.g., storage size, etc.) is committed to the blockchain network and made available to all the cloud (storage) providers. Multiple cloud providers (e.g., one or more cloud providers of all of the cloud providers) then provide offers (e.g., respective proposals) based on the information/needs expressed in the request along with the pricing details (e.g., I/O performance of such an amount costs X, to be able to hold Y amount of replicas costs Z, etc.).

A natural language processing service, which is trained on a policy/proposal data model (e.g., the natural language processing service is trained on storage/cloud storage jargon and can correlate technical aspects of storage to costs associated with the use of the storage) analyzes the details of the service providers' offers and compares them with the information/requirements provided by the user in the request.

Details of the best matched policy/proposal (e.g., best fit to the information/requirements and at a minimal cost) is committed to the user on the blockchain network and all other cloud providers can see the chosen best matched policy/proposal. In some embodiments, depending upon the usage and an availability pattern, a different cloud provider could provide a (better) subsequent offer to the user. An offer service analyzes such information and either accepts or rejects the subsequent offer based on the information/requirements of the request and the proposed cost.

Figure 5A:
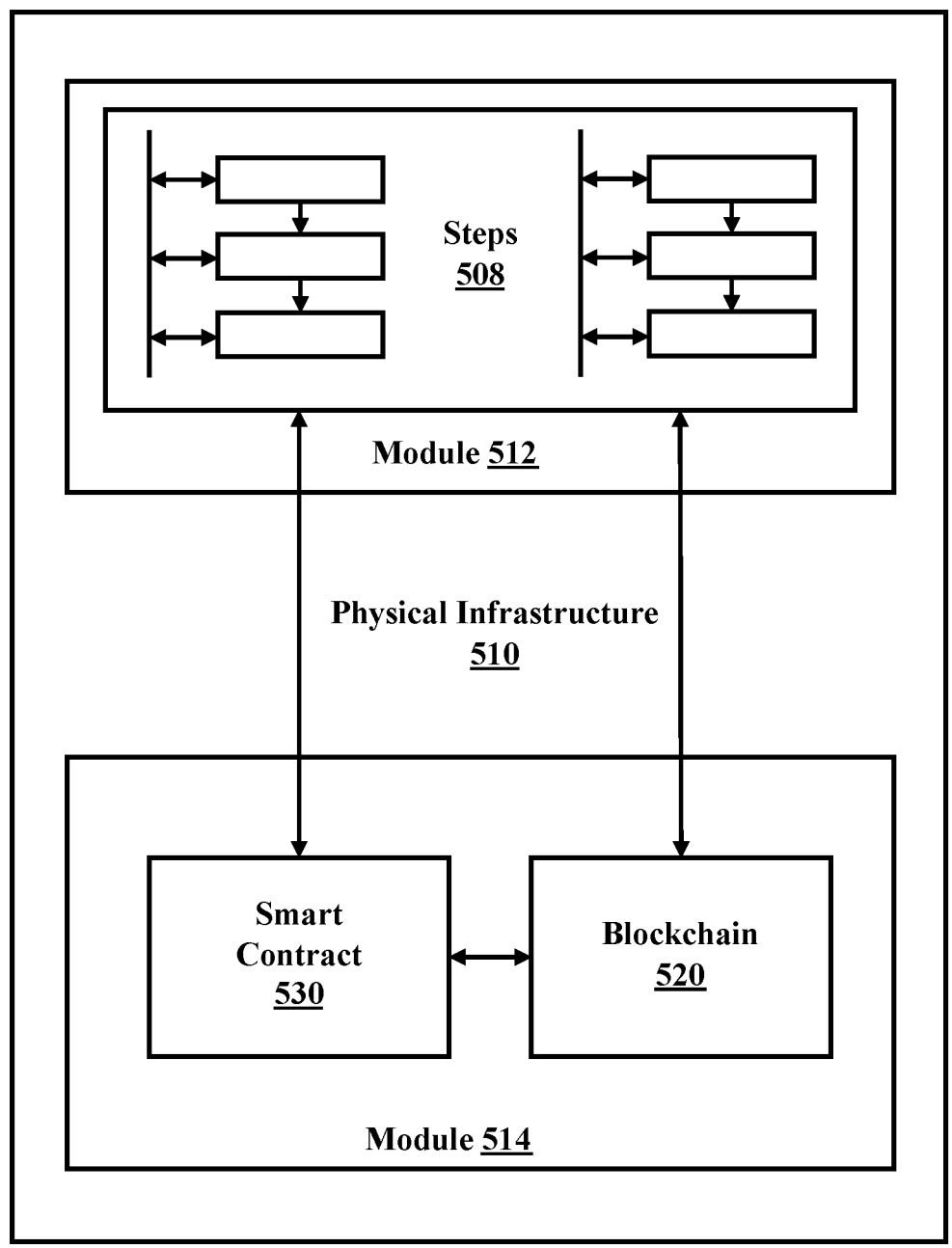
FIG. 5A illustrates an example system configured to perform one or more operations described herein, in accordance with embodiments of the present disclosure.

FIG. 5A illustrates an example system 500 that includes a physical infrastructure 510 configured to perform various operations in accordance with embodiments of the present disclosure. Referring to FIG. 5A, the physical infrastructure 510 includes a module 512 and a module 514. The module 514 includes a blockchain 520 and a smart contract 530 (which may reside on the blockchain 520), that may execute any of the operational steps 508 (in module 512) included in any of the example embodiments. The steps/operations 508 may include one or more of the embodiments described or depicted and may represent output or written information that is written or read from one or more smart contracts 530 and/or blockchains 520. The physical infrastructure 510, the module 512, and the module 514 may include one or more computers, servers, processors, memories, and/or wireless communication devices. Further, the module 512 and the module 514 may be a same module.

Figure 5B:
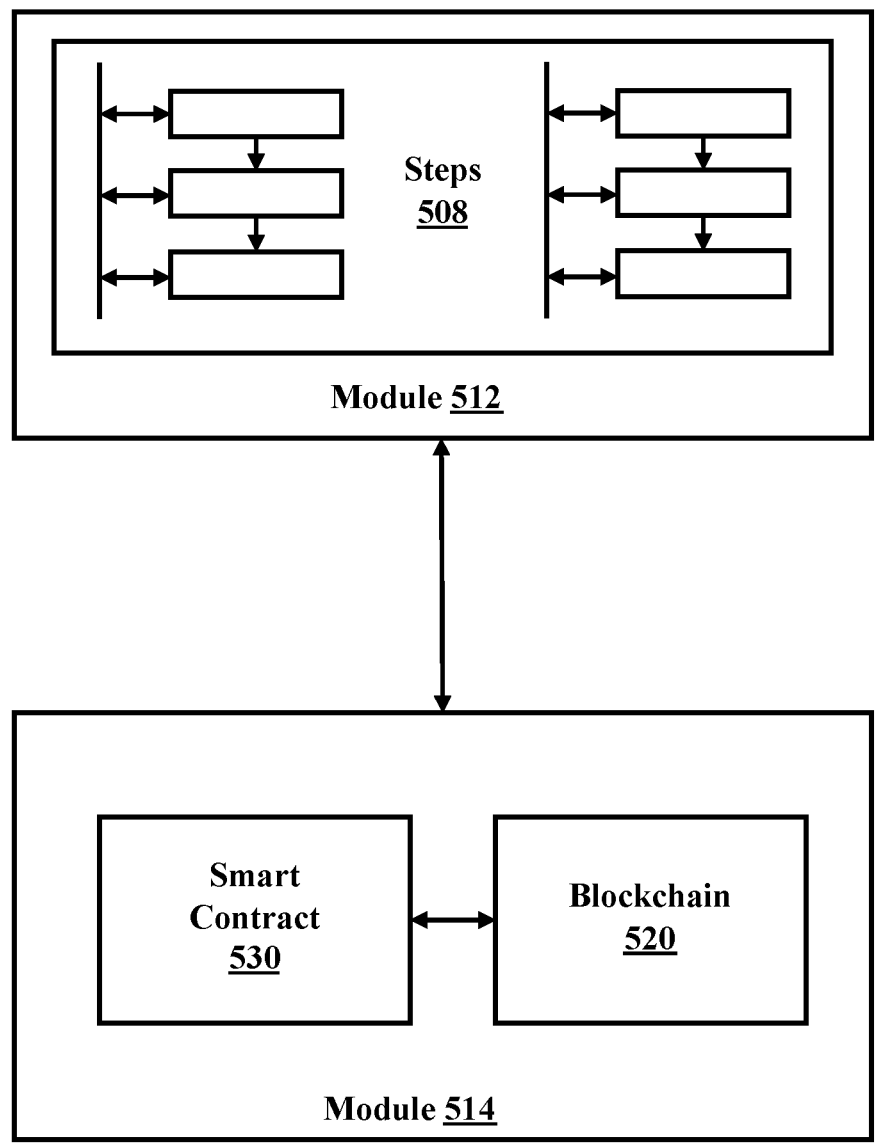
FIG. 5B illustrates another example system configured to perform one or more operations described herein, in accordance with embodiments of the present disclosure.

FIG. 5B illustrates another example system 540 configured to perform various operations in accordance with embodiments of the present disclosure. Referring to FIG. 5B, the system 540 includes a module 512 and a module 514. The module 514 includes a blockchain 520 and a smart contract 530 (which may reside on the blockchain 520), that may execute any of the operational steps 508 (in module 512) included in any of the example embodiments. The steps/operations 508 may include one or more of the embodiments described or depicted and may represent output or written information that is written or read from one or more smart contracts 530 and/or blockchains 520. The physical module 512 and the module 514 may include one or more computers, servers, processors, memories, and/or wireless communication devices. Further, the module 512 and the module 514 may be a same module.

Figure 5C:
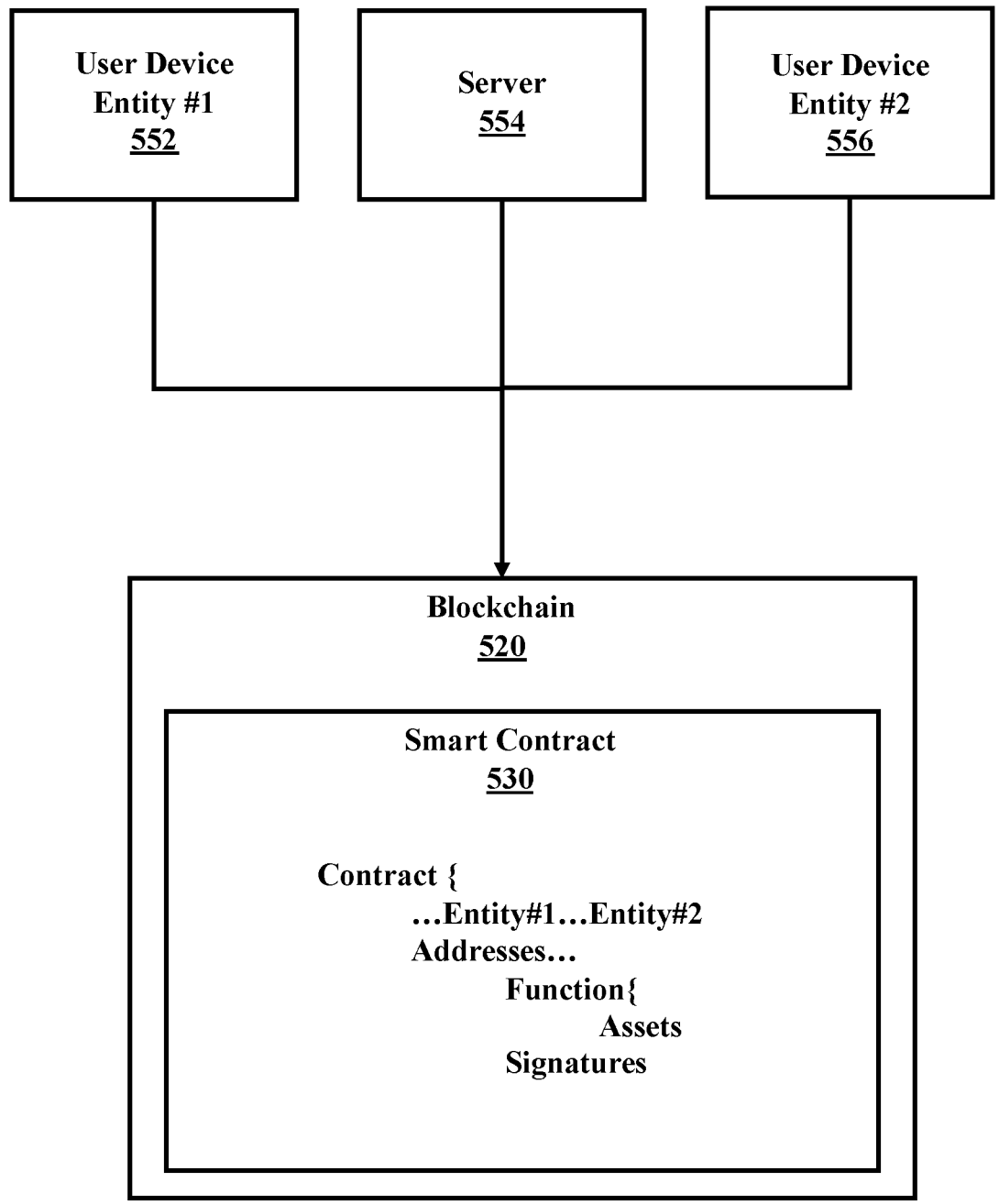
FIG. 5C illustrates a further example system configured to utilize a smart contract, in accordance with embodiments of the present disclosure.

FIG. 5C illustrates an example system configured to utilize a smart contract configuration among contracting parties and a mediating server configured to enforce the smart contract terms on the blockchain in accordance with embodiments of the present disclosure. Referring to FIG. 5C, the configuration 550 may represent a communication session, an asset transfer session or a process or procedure that is driven by a smart contract 530 which explicitly identifies one or more user devices 552 and/or 556. The execution, operations and results of the smart contract execution may be managed by a server 554. Content of the smart contract 530 may require digital signatures by one or more of the entities 552 and 556 which are parties to the smart contract transaction. The results of the smart contract execution may be written to a blockchain 520 as a blockchain transaction. The smart contract 530 resides on the blockchain 520 which may reside on one or more computers, servers, processors, memories, and/or wireless communication devices.

Figure 5D:
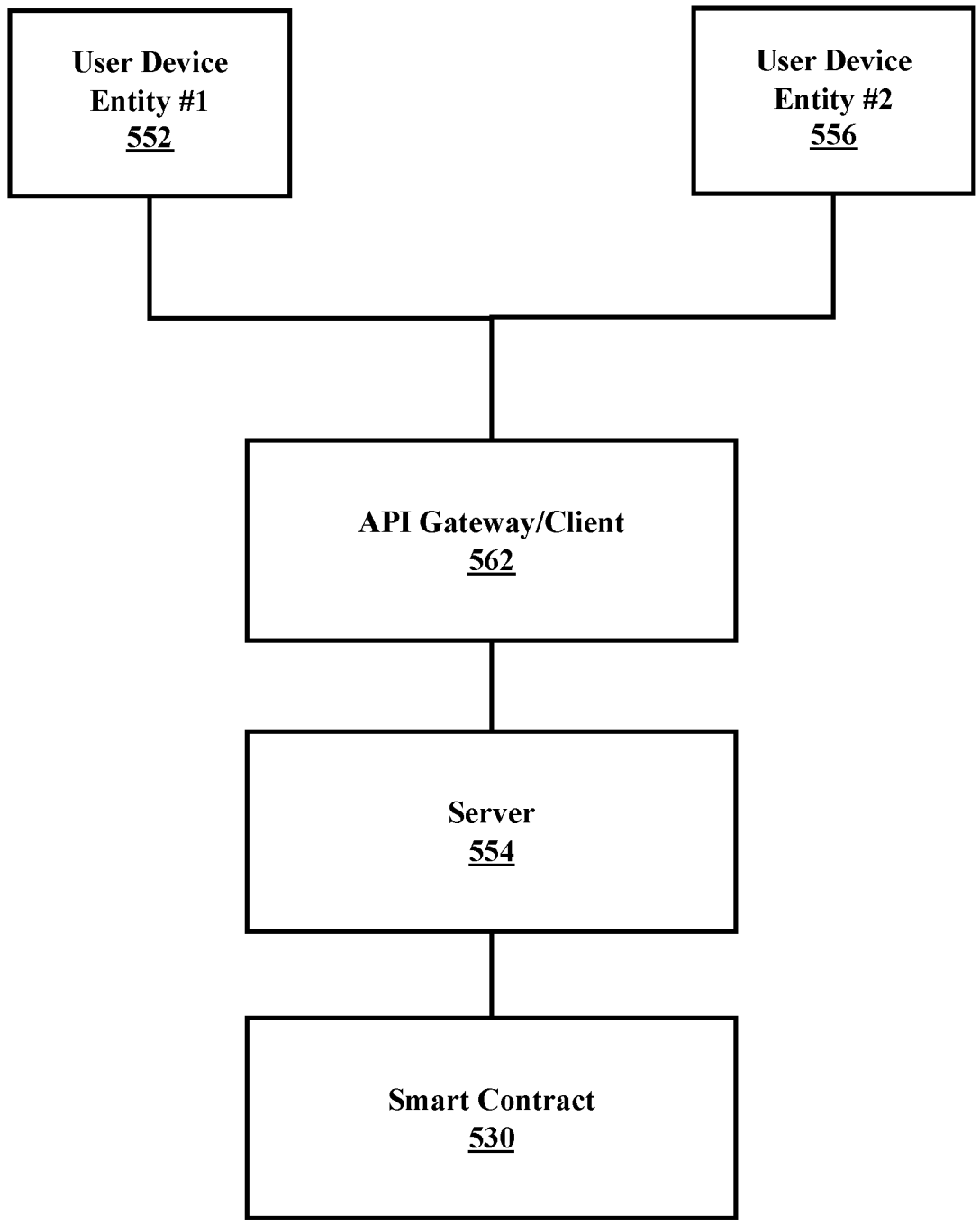
FIG. 5D illustrates yet another example system configured to utilize a blockchain, in accordance with embodiments of the present disclosure.

FIG. 5D illustrates a system 560 including a blockchain, in accordance with embodiments of the present disclosure. Referring to the example of FIG. 5D, an application programming interface (API) gateway 562 provides a common interface for accessing blockchain logic (e.g., smart contract 530 or other chaincode) and data (e.g., distributed ledger, etc.). In this example, the API gateway 562 is a common interface for performing transactions (e.g., invoke, queries, etc.) on the blockchain by connecting one or more entities 552 and 556 to a blockchain peer (e.g., server 554). Here, the server 554 is a blockchain network peer component that holds a copy of the world state and a distributed ledger allowing clients 552 and 556 to query data on the world state as well as submit transactions into the blockchain network where, depending on the smart contract 530 and endorsement policy, endorsing peers will run the smart contracts 530.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components.

Figure 6A:
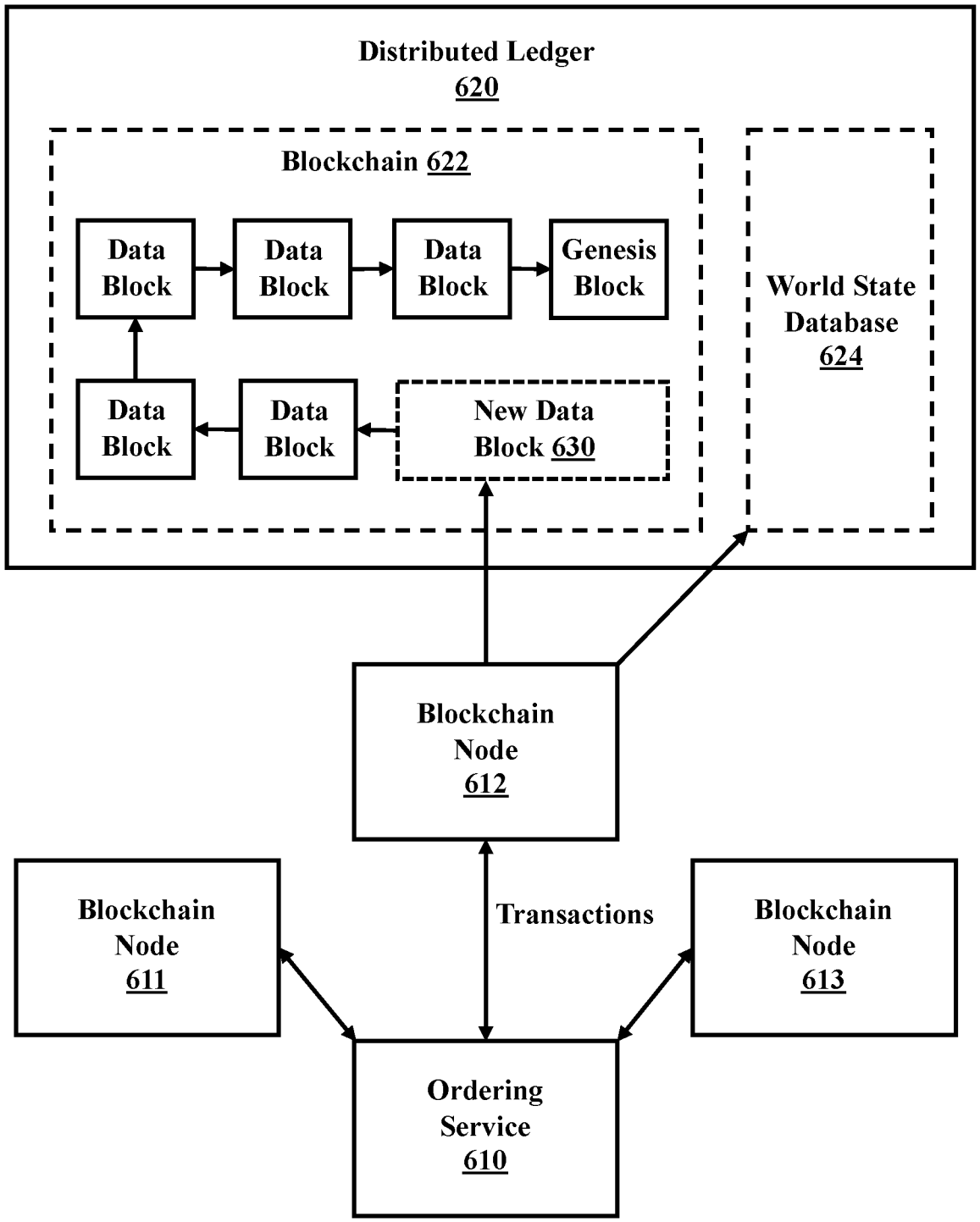
FIG. 6A illustrates a process for a new block being added to a distributed ledger, in accordance with embodiments of the present disclosure.
Figure 6B:
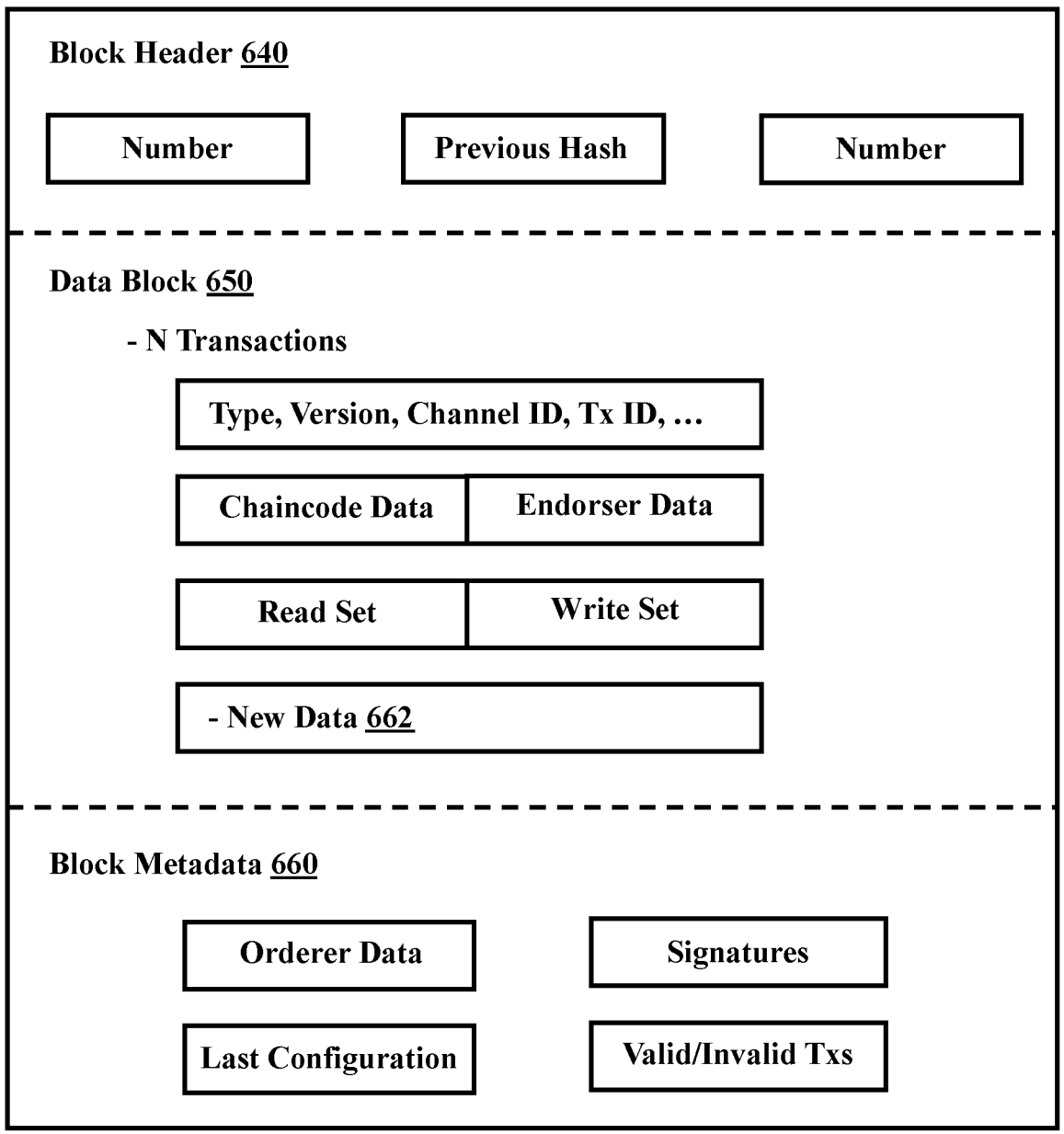
FIG. 6B illustrates contents of a new data block, in accordance with embodiments of the present disclosure.

FIG. 6A illustrates a process 600 of a new block being added to a distributed ledger 620, in accordance with embodiments of the present disclosure (e.g., when a new smart contract is generated, etc.), and FIG. 6B illustrates contents of a new data block structure 630 for blockchain, in accordance with embodiments of the present disclosure. The new data block 630 may contain document linking data.

Referring to FIG. 6A, clients (not shown) may submit transactions to blockchain nodes 611, 612, and/or 613. Clients may be instructions received from any source to enact activity on the blockchain 620. As an example, clients may be applications that act on behalf of a requester, such as a device, person or entity to propose transactions for the blockchain. The plurality of blockchain peers (e.g., blockchain nodes 611, 612, and 613) may maintain a state of the blockchain network and a copy of the distributed ledger 620. Different types of blockchain nodes/peers may be present in the blockchain network including endorsing peers which simulate and endorse transactions proposed by clients; recommending nodes which utilize natural language processing techniques and recommend entities to be automatically contracted with users; and committing peers which verify endorsements, validate transactions, and commit transactions to the distributed ledger 620. In this example, the blockchain nodes 611, 612, and 613 may perform the role of endorser node, committer node, recommender node, or all three.

The distributed ledger 620 includes a blockchain which stores immutable, sequenced records in blocks, and a state database 624 (current world state) maintaining a current state of the blockchain 622. One distributed ledger 620 may exist per channel and each peer maintains its own copy of the distributed ledger 620 for each channel of which they are a member. The blockchain 622 is a transaction log, structured as hash-linked blocks where each block contains a sequence of N transactions. Blocks may include various components such as shown in FIG. 6B. The linking of the blocks (shown by arrows in FIG. 6A) may be generated by adding a hash of a prior block's header within a block header of a current block. In this way, all transactions on the blockchain 622 are sequenced and cryptographically linked together preventing tampering with blockchain data without breaking the hash links. Furthermore, because of the links, the latest block in the blockchain 622 represents every transaction that has come before it. The blockchain 622 may be stored on a peer file system (local or attached storage), which supports an append-only blockchain workload.

The current state of the blockchain 622 and the distributed ledger 622 may be stored in the state database 624. Here, the current state data represents the latest values for all keys ever included in the chain transaction log of the blockchain 622. Chaincode invocations execute transactions against the current state in the state database 624. To make these chaincode interactions extremely efficient, the latest values of all keys are stored in the state database 624. The state database 624 may include an indexed view into the transaction log of the blockchain 622, it can therefore be regenerated from the chain at any time. The state database 624 may automatically get recovered (or generated if needed) upon peer startup, before transactions are accepted.

Endorsing nodes receive transactions from clients and endorse the transaction based on simulated results. Endorsing nodes hold smart contracts which simulate the transaction proposals. When an endorsing node endorses a transaction, the endorsing node creates a transaction endorsement which is a signed response from the endorsing node to the client application indicating the endorsement of the simulated transaction. The method of endorsing a transaction depends on an endorsement policy which may be specified within chaincode. An example of an endorsement policy is "the majority of endorsing peers must endorse the transaction". Different channels may have different endorsement policies. Endorsed transactions are forward by the client application to ordering service 610.

The ordering service 610 accepts endorsed transactions, orders them into a block, and delivers the blocks to the committing peers. For example, the ordering service 610 may initiate a new block when a threshold of transactions has been reached, a timer times out, or another condition. In the example of FIG. 6A, blockchain node 612 is a committing peer that has received a new data new data block 630 for storage on blockchain 620. The first block in the blockchain may be referred to as a genesis block which includes information about the blockchain, its members, the data stored therein, etc.

The ordering service 610 may be made up of a cluster of orderers. The ordering service 610 does not process transactions, smart contracts, or maintain the shared ledger. Rather, the ordering service 610 may accept the endorsed transactions and specifies the order in which those transactions are committed to the distributed ledger 620. The architecture of the blockchain network may be designed such that the specific implementation of 'ordering' becomes a pluggable component.

Transactions are written to the distributed ledger 620 in a consistent order. The order of transactions is established to ensure that the updates to the state database 624 are valid when they are committed to the network. Unlike a cryptocurrency blockchain system where ordering occurs through the solving of a cryptographic puzzle, or mining, in this example the parties of the distributed ledger 620 may choose the ordering mechanism that best suits that network.

When the ordering service 610 initializes a new data block 630, the new data block 630 may be broadcast to committing peers (e.g., blockchain nodes 611, 612, and 613). In response, each committing peer validates the transaction within the new data block 630 by checking to make sure that the read set and the write set still match the current world state in the state database 624. Specifically, the committing peer can determine whether the read data that existed when the endorsers simulated the transaction is identical to the current world state in the state database 624. When the committing peer validates the transaction, the transaction is written to the blockchain 622 on the distributed ledger 620, and the state database 624 is updated with the write data from the read-write set. If a transaction fails, that is, if the committing peer finds that the read-write set does not match the current world state in the state database 624, the transaction ordered into a block will still be included in that block, but it will be marked as invalid, and the state database 624 will not be updated.

Referring to FIG. 6B, a new data block 630 (also referred to as a data block) that is stored on the blockchain 622 of the distributed ledger 620 may include multiple data segments such as a block header 640, block data 650, and block metadata 660. It should be appreciated that the various depicted blocks and their contents, such as new data block 630 and its contents. Shown in FIG. 6B are merely examples and are not meant to limit the scope of the example embodiments. The new data block 630 may store transactional information of N transaction(s) (e.g., 1, 10, 100, 500, 1000, 2000, 3000, etc.) within the block data 650. The new data block 630 may also include a link to a previous block (e.g., on the blockchain 622 in FIG. 6A) within the block header 640. In particular, the block header 640 may include a hash of a previous block's header. The block header 640 may also include a unique block number, a hash of the block data 650 of the new data block 630, and the like. The block number of the new data block 630 may be unique and assigned in various orders, such as an incremental/sequential order starting from zero.

The block data 650 may store transactional information of each transaction that is recorded within the new data block 630. For example, the transaction data may include one or more of a type of the transaction, a version, a timestamp, a channel ID of the distributed ledger 620, a transaction ID, an epoch, a payload visibility, a chaincode path (deploy tx), a chaincode name, a chaincode version, input (chaincode and functions), a client (creator) identify such as a public key and certificate, a signature of the client, identities of endorsers, endorser signatures, a proposal hash, chaincode events, response status, namespace, a read set (list of key and version read by the transaction, etc.), a write set (list of key and value, etc.), a start key, an end key, a list of keys, a Merkle tree query summary, and the like. The transaction data may be stored for each of the N transactions.

In some embodiments, the block data 650 may also store new data 662 which adds additional information to the hash-linked chain of blocks in the blockchain 622. The additional information includes one or more of the steps, features, processes and/or actions described or depicted herein. Accordingly, the new data 662 can be stored in an immutable log of blocks on the distributed ledger 620. Some of the benefits of storing such new data 662 are reflected in the various embodiments disclosed and depicted herein. Although in FIG. 6B the new data 662 is depicted in the block data 650 but could also be located in the block header 640 or the block metadata 660. The new data 662 may include a document composite key that is used for linking the documents within an organization.

The block metadata 660 may store multiple fields of metadata (e.g., as a byte array, etc.). Metadata fields may include signature on block creation, a reference to a last configuration block, a transaction filter identifying valid and invalid transactions within the block, last offset persisted of an ordering service that ordered the block, and the like. The signature, the last configuration block, and the orderer metadata may be added by the ordering service 610. Meanwhile, a committer of the block (such as blockchain node 612) may add validity/invalidity information based on an endorsement policy, verification of read/write sets, and the like. The transaction filter may include a byte array of a size equal to the number of transactions in the block data 650 and a validation code identifying whether a transaction was valid/invalid.

Figure 6C:
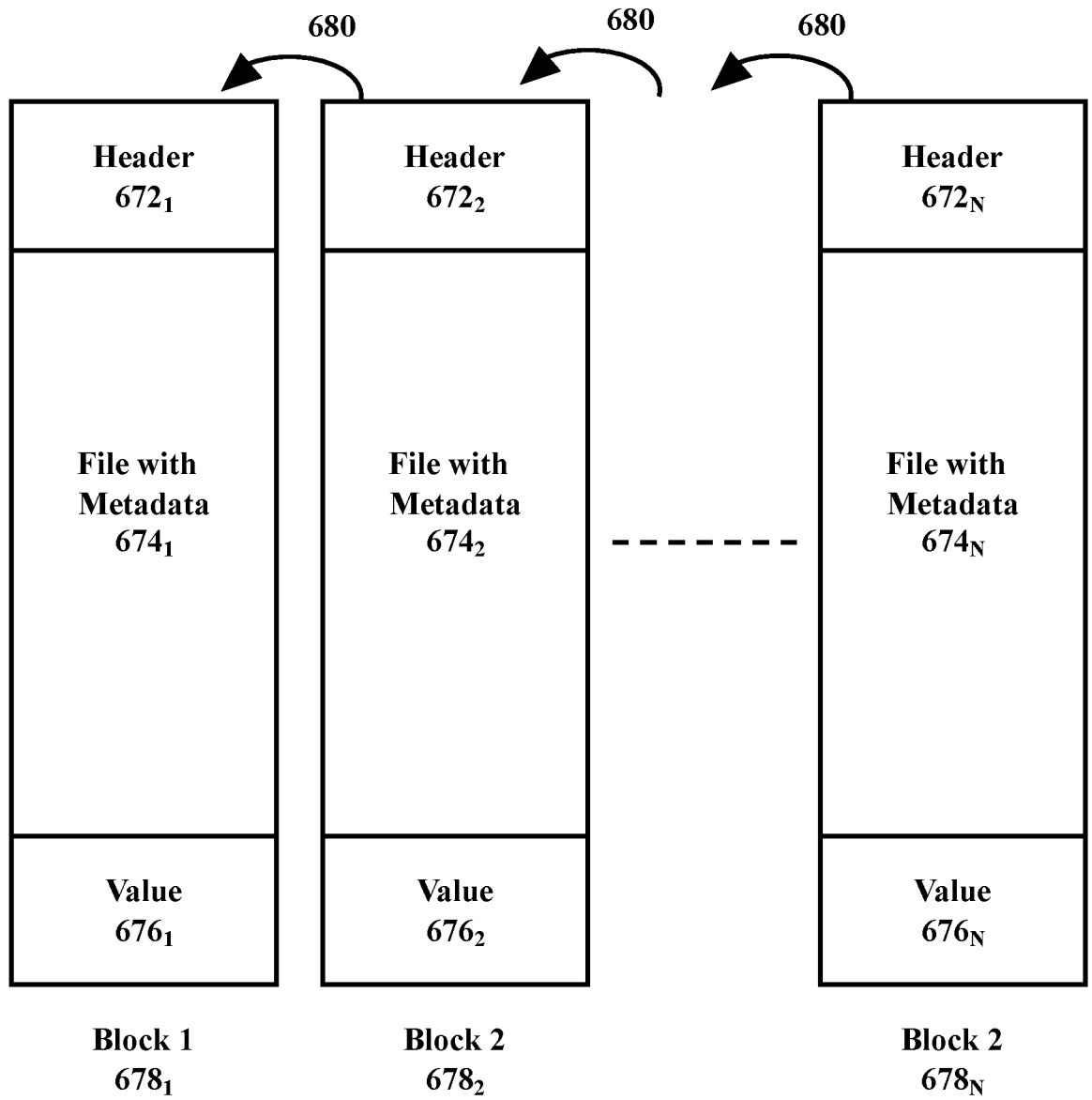
FIG. 6C illustrates a blockchain for digital content, in accordance with embodiments of the present disclosure.

FIG. 6C illustrates an embodiment of a blockchain 670 for digital content in accordance with the embodiments described herein. The digital content may include one or more files and associated information. The files may include media, images, video, audio, text, links, graphics, animations, web pages, documents, or other forms of digital content. The immutable, append-only aspects of the blockchain serve as a safeguard to protect the integrity, validity, and authenticity of the digital content, making it suitable use in legal proceedings where admissibility rules apply or other settings where evidence is taken in to consideration or where the presentation and use of digital information is otherwise of interest. In this case, the digital content may be referred to as digital evidence.

The blockchain may be formed in various ways. In one embodiment, the digital content may be included in and accessed from the blockchain itself. For example, each block of the blockchain may store a hash value of reference information (e.g., header, value, etc.) along the associated digital content. The hash value and associated digital content may then be encrypted together. Thus, the digital content of each block may be accessed by decrypting each block in the blockchain, and the hash value of each block may be used as a basis to reference a previous block. This may be illustrated as follows:

| Block 1 | Block 2 | ... | Block N |
|---|---|---|---|
| Hash Value 1 | Hash Value 2 | | Hash Value N |
| Digital Content 1 | Digital Content 2 | | Digital Content N |

In one embodiment, the digital content may be not included in the blockchain. For example, the blockchain may store the encrypted hashes of the content of each block without any of the digital content. The digital content may be stored in another storage area or memory address in association with the hash value of the original file. The other storage area may be the same storage device used to store the blockchain or may be a different storage area or even a separate relational database. The digital content of each block may be referenced or accessed by obtaining or querying the hash value of a block of interest and then looking up that has value in the storage area, which is stored in correspondence with the actual digital content. This operation may be performed, for example, a database gatekeeper. This may be illustrated as follows:

| Blockchain | Storage Area |
|---|---|
| Block 1 Hash Value | Block 1 Hash Value . . . Content |
| Block N Hash Value | Block N Hash Value . . . Content |

In the example embodiment of FIG. 6C, the blockchain 670 includes a number of blocks $678_1$, $678_2$, ... $678_N$ cryptographically linked in an ordered sequence, where N≥1. The encryption used to link the blocks $678_1$, $678_2$, ... $678_N$ may be any of a number of keyed or un-keyed Hash functions. In one embodiment, the blocks $678_1$, $678_2$, ... $678_N$ are subject to a hash function which produces n-bit alphanumeric outputs (where n is 256 or another number) from inputs that are based on information in the blocks. Examples of such a hash function include, but are not limited to, a SHA-type (SHA stands for Secured Hash Algorithm) algorithm, Merkle-Damgard algorithm, HAIFA algorithm, Merkle-tree algorithm, nonce-based algorithm, and a non-collision-resistant PRF algorithm. In another embodiment, the blocks $678_1$, $678_2$, ..., $678_N$ may be cryptographically linked by a function that is different from a hash function. For purposes of illustration, the following description is made with reference to a hash function, e.g., SHA-2.

Each of the blocks $678_1$, $678_2$, ..., $678_N$ in the blockchain includes a header, a version of the file, and a value. The header and the value are different for each block as a result of hashing in the blockchain. In one embodiment, the value may be included in the header. As described in greater detail below, the version of the file may be the original file or a different version of the original file.

The first block $678_1$ in the blockchain is referred to as the genesis block and includes the header $672_1$, original file $674_1$, and an initial value $676_1$. The hashing scheme used for the genesis block, and indeed in all subsequent blocks, may vary. For example, all the information in the first block $678_1$ may be hashed together and at one time, or each or a portion of the information in the first block $678_1$ may be separately hashed and then a hash of the separately hashed portions may be performed.

The header $672_1$ may include one or more initial parameters, which, for example, may include a version number, timestamp, nonce, root information, difficulty level, consensus protocol, duration, media format, source, descriptive keywords, and/or other information associated with original file $674_1$ and/or the blockchain. The header $672_1$ may be generated automatically (e.g., by blockchain network managing software) or manually by a blockchain participant. Unlike the header in other blocks $678_2$ to $678_N$ in the blockchain, the header $672_1$ in the genesis block does not reference a previous block, simply because there is no previous block.

The original file $674_1$ in the genesis block may be, for example, data as captured by a device with or without processing prior to its inclusion in the blockchain. The original file $674_1$ is received through the interface of the system from the device, media source, or node. The original file $674_1$ is associated with metadata, which, for example, may be generated by a user, the device, and/or the system processor, either manually or automatically. The metadata may be included in the first block $678_1$ in association with the original file $674_1$.

The value $676_1$ in the genesis block is an initial value generated based on one or more unique attributes of the original file $674_1$. In one embodiment, the one or more unique attributes may include the hash value for the original file $674_1$, metadata for the original file $674_1$, and other information associated with the file. In one implementation, the initial value $676_1$ may be based on the following unique attributes: 1) SHA-2 computed hash value for the original file; 2) originating device ID; 3) starting timestamp for the original file; 4) initial storage location of the original file; 5) blockchain network member ID for software to currently control the original file and associated metadata.

The other blocks $678_2$ to $678_N$ in the blockchain also have headers, files, and values. However, unlike the first block $672_1$, each of the headers $672_2$ to $672_N$ in the other blocks includes the hash value of an immediately preceding block. The hash value of the immediately preceding block may be just the hash of the header of the previous block or may be the hash value of the entire previous block. By including the hash value of a preceding block in each of the remaining blocks, a trace can be performed from the Nth block back to the genesis block (and the associated original file) on a block-by-block basis, as indicated by arrows 680, to establish an auditable and immutable chain-of-custody.

Each of the header $672_2$ to $672_N$ in the other blocks may also include other information, e.g., version number, timestamp, nonce, root information, difficulty level, consensus protocol, and/or other parameters or information associated with the corresponding files and/or the blockchain in general.

The files $674_2$ to $674_N$ in the other blocks may be equal to the original file or may be a modified version of the original file in the genesis block depending, for example, on the type of processing performed. The type of processing performed may vary from block to block. The processing may involve, for example, any modification of a file in a preceding block, such as redacting information or otherwise changing the content of, taking information away from, or adding or appending information to the files.

Additionally, or alternatively, the processing may involve merely copying the file from a preceding block, changing a storage location of the file, analyzing the file from one or more preceding blocks, moving the file from one storage or memory location to another, or performing action relative to the file of the blockchain and/or its associated metadata. Processing which involves analyzing a file may include, for example, appending, including, or otherwise associating various analytics, statistics, or other information associated with the file.

The values in each of the other blocks $676_2$ to $676_N$ in the other blocks are unique values and are all different as a result of the processing performed. For example, the value in any one block corresponds to an updated version of the value in the previous block. The update is reflected in the hash of the block to which the value is assigned. The values of the blocks therefore provide an indication of what processing was performed in the blocks and also permit a tracing through the blockchain back to the original file. This tracking confirms the chain-of-custody of the file throughout the entire blockchain.

For example, consider the case where portions of the file in a previous block are redacted, blocked out, or pixelated in order to protect the identity of a person shown in the file. In this case, the block including the redacted file will include metadata associated with the redacted file, e.g., how the redaction was performed, who performed the redaction, timestamps where the redaction(s) occurred, etc. The metadata may be hashed to form the value. Because the metadata for the block is different from the information that was hashed to form the value in the previous block, the values are different from one another and may be recovered when decrypted.

In one embodiment, the value of a previous block may be updated (e.g., a new hash value computed) to form the value of a current block when any one or more of the following occurs. The new hash value may be computed by hashing all or a portion of the information noted below, in this example embodiment.

a) new SHA-2 computed hash value if the file has been processed in any way (e.g., if the file was redacted, copied, altered, accessed, or some other action was taken)
b) new storage location for the file
c) new metadata identified associated with the file
d) transfer of access or control of the file from one blockchain participant to another blockchain participant FIG. 6D illustrates an embodiment of a block which may represent the structure of the blocks in the blockchain 690 in accordance with one embodiment. The block, $Block_i$, includes a header $672_i$, a file $674_i$, and a value $676_i$.

The header $672_i$ includes a hash value of a previous block $Block_{i-1}$ and additional reference information, which, for example, may be any of the types of information (e.g., header information including references, characteristics, parameters, etc.) discussed herein. All blocks reference the hash of a previous block except, of course, the genesis block. The hash value of the previous block may be just a hash of the header in the previous block or a hash of all or a portion of the information in the previous block, including the file and metadata.

The file $674_i$ includes a plurality of data, such as Data 1, Data 2, . . . , Data N in sequence. The data are tagged with Metadata 1, Metadata 2, . . . , Metadata N which describe the content and/or characteristics associated with the data. For example, the metadata for each data may include information to indicate a timestamp for the data, process the data, keywords indicating the persons or other content depicted in the data, and/or other features that may be helpful to establish the validity and content of the file as a whole, and particularly its use a digital evidence, for example, as described in connection with an embodiment discussed below. In addition to the metadata, each data may be tagged with reference $REF_1$, $REF_2$, . . . , $REF_N$ to a previous data to prevent tampering, gaps in the file, and sequential reference through the file.

Once the metadata is assigned to the data (e.g., through a smart contract), the metadata cannot be altered without the hash changing, which can easily be identified for invalidation. The metadata, thus, creates a data log of information that may be accessed for use by participants in the blockchain.

The value $676_i$ is a hash value or other value computed based on any of the types of information previously discussed. For example, for any given block $Block_i$, the value for that block may be updated to reflect the processing that was performed for that block, e.g., new hash value, new storage location, new metadata for the associated file, transfer of control or access, identifier, or other action or information to be added. Although the value in each block is shown to be separate from the metadata for the data of the file and header, the value may be based, in part or whole, on this metadata in another embodiment.

Once the blockchain 670 is formed, at any point in time, the immutable chain-of-custody for the file may be obtained by querying the blockchain for the transaction history of the values across the blocks. This query, or tracking procedure, may begin with decrypting the value of the block that is most currently included (e.g., the last ($N^{th}$) block), and then continuing to decrypt the value of the other blocks until the genesis block is reached and the original file is recovered. The decryption may involve decrypting the headers and files and associated metadata at each block, as well.

Decryption is performed based on the type of encryption that took place in each block. This may involve the use of private keys, public keys, or a public key-private key pair. For example, when asymmetric encryption is used, blockchain participants or a processor in the network may generate a public key and private key pair using a predetermined algorithm. The public key and private key are associated with each other through some mathematical relationship. The public key may be distributed publicly to serve as an address to receive messages from other users, e.g., an IP address or home address. The private key is kept secret and used to digitally sign messages sent to other blockchain participants. The signature is included in the message so that the recipient can verify using the public key of the sender. This way, the recipient can be sure that only the sender could have sent this message.

Generating a key pair may be analogous to creating an account on the blockchain, but without having to actually register anywhere. Also, every transaction that is executed on the blockchain is digitally signed by the sender using their private key. This signature ensures that only the owner of the account can track and process (if within the scope of permission determined by a smart contract) the file of the blockchain.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7A:
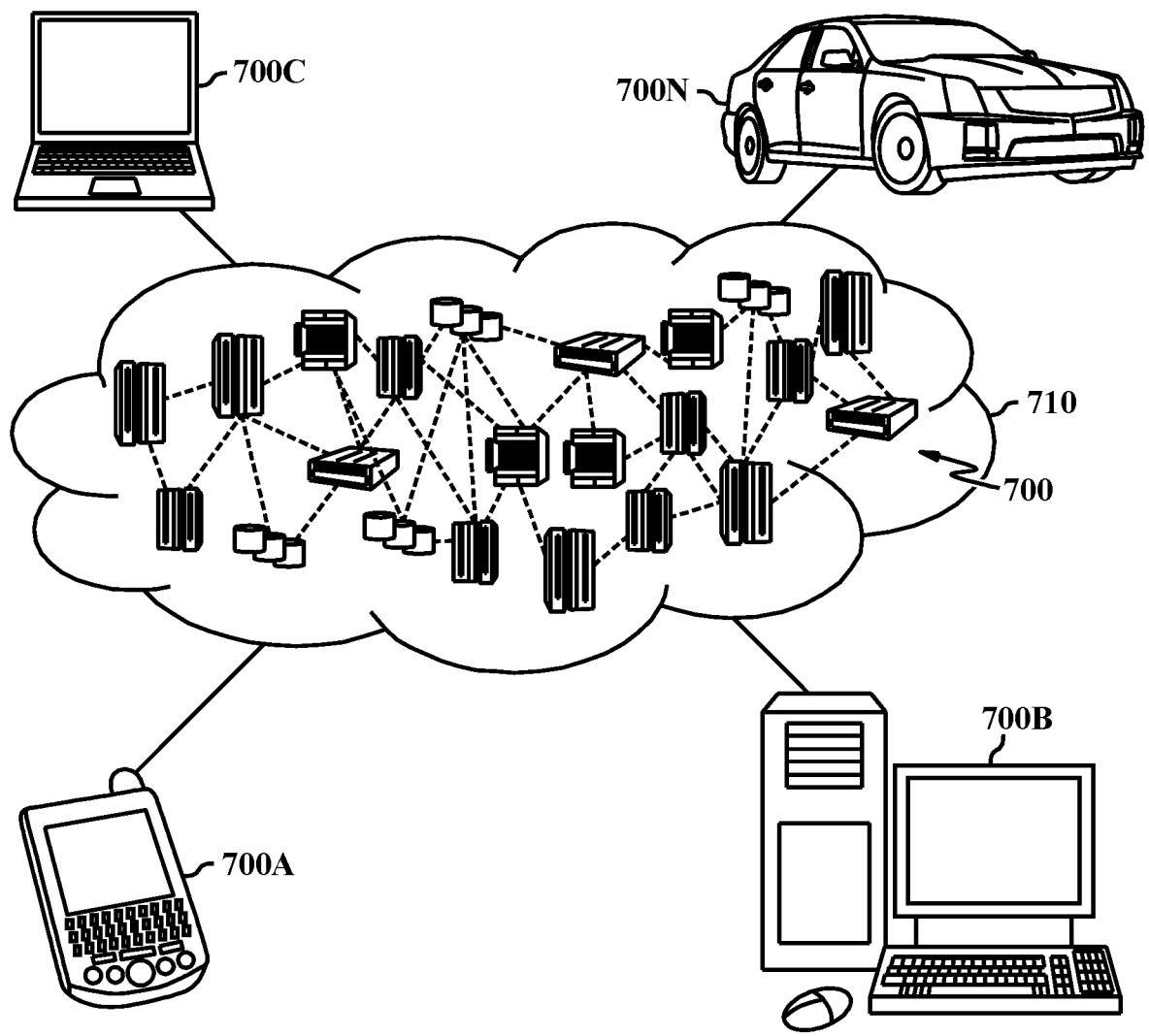
FIG. 7A illustrates a cloud computing environment, in accordance with embodiments of the present disclosure.

FIG. 7A, illustrated is a cloud computing environment 710 is depicted. As shown, cloud computing environment 710 includes one or more cloud computing nodes 700 with which local computing devices used by cloud consumers, such as, for example, personal digital assistant (PDA) or cellular telephone 700A, desktop computer 700B, laptop computer 700C, and/or automobile computer system 700N may communicate. Nodes 700 may communicate with one another. They may be grouped (not shown) physically or virtually, in one or more networks, such as Private, Community, Public, or Hybrid clouds as described hereinabove, or a combination thereof.

This allows cloud computing environment 710 to offer infrastructure, platforms and/or software as services for which a cloud consumer does not need to maintain resources on a local computing device. It is understood that the types of computing devices 700A-N shown in FIG. 7A are intended to be illustrative only and that computing nodes 700 and cloud computing environment 710 can communicate with any type of computerized device over any type of network and/or network addressable connection (e.g., using a web browser).

Figure 7B:
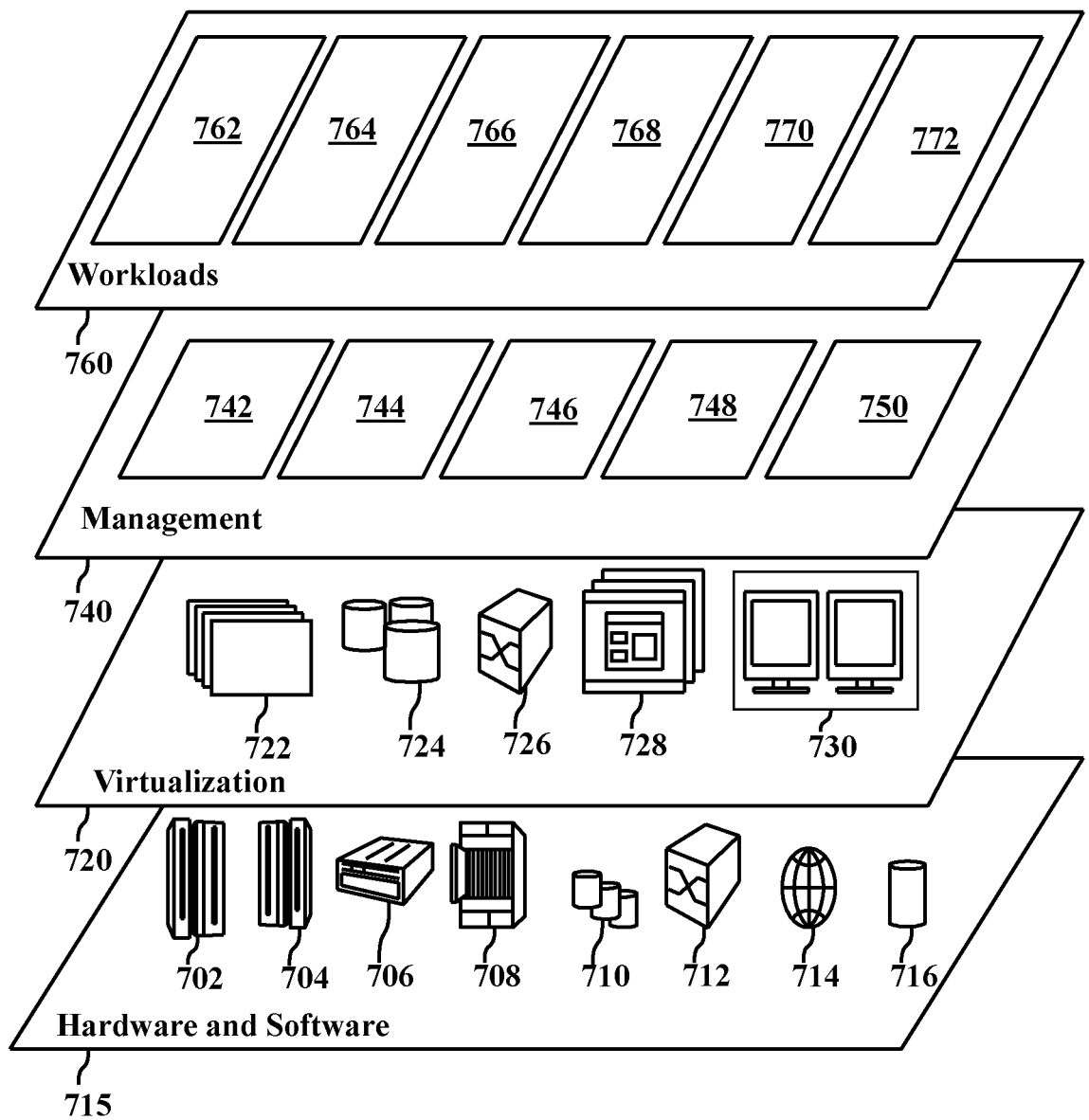
FIG. 7B illustrates abstraction model layers, in accordance with embodiments of the present disclosure.

FIG. 7B, illustrated is a set of functional abstraction layers provided by cloud computing environment 710 (FIG. 7A) is shown. It should be understood in advance that the components, layers, and functions shown in FIG. 7B are intended to be illustrative only and embodiments of the disclosure are not limited thereto. As depicted below, the following layers and corresponding functions are provided.

Hardware and software layer 715 includes hardware and software components. Examples of hardware components include: mainframes 702; RISC (Reduced Instruction Set Computer) architecture based servers 704; servers 706; blade servers 708; storage devices 710; and networks and networking components 712. In some embodiments, software components include network application server software 714 and database software 716.

Virtualization layer 720 provides an abstraction layer from which the following examples of virtual entities may be provided: virtual servers 722; virtual storage 724; virtual networks 726, including virtual private networks; virtual applications and operating systems 728; and virtual clients 730.

In one example, management layer 740 may provide the functions described below. Resource provisioning 742 provides dynamic procurement of computing resources and other resources that are utilized to perform tasks within the cloud computing environment. Metering and Pricing 744 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 746 provides access to the cloud computing environment for consumers and system administrators. Service level management 748 provides cloud computing resource allocation and management such that required service levels are met. Service Level Agreement (SLA) planning and fulfillment 750 provide pre-arrangement for, and procurement of, cloud computing resources for which a future requirement is anticipated in accordance with an SLA.

Workloads layer 760 provides examples of functionality for which the cloud computing environment may be utilized. Examples of workloads and functions which may be provided from this layer include: mapping and navigation 762; software development and lifecycle management 764; virtual classroom education delivery 766; data analytics processing 768; transaction processing 770; and automatic visualization generating 772.

Figure 8:
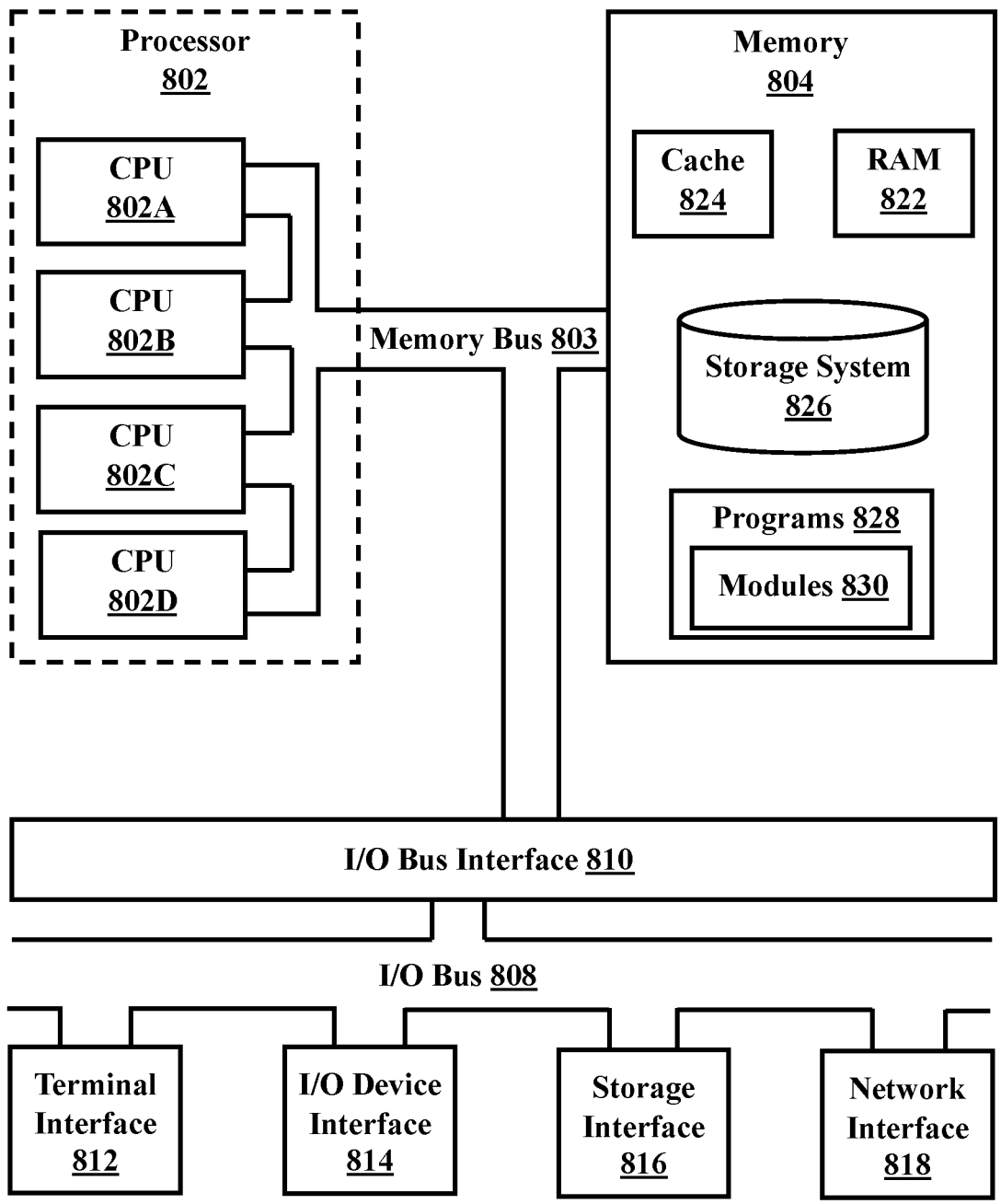
FIG. 8 illustrates a high-level block diagram of an example computer system that may be used in implementing one or more of the methods, tools, and modules, and any related functions, described herein, in accordance with embodiments of the present disclosure.

FIG. 8, illustrated is a high-level block diagram of an example computer system 801 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 801 may comprise one or more CPUs 802, a memory subsystem 804, a terminal interface 812, a storage interface 816, an I/O (Input/Output) device interface 814, and a network interface 818, all of which may be communicatively coupled, directly or indirectly, for inter-component communication via a memory bus 803, an I/O bus 808, and an I/O bus interface unit 810.

The computer system 801 may contain one or more general-purpose programmable central processing units (CPUs) 802A, 802B, 802C, and 802D, herein generically referred to as the CPU 802. In some embodiments, the computer system 801 may contain multiple processors typical of a relatively large system; however, in other embodiments the computer system 801 may alternatively be a single CPU system. Each CPU 802 may execute instructions stored in the memory subsystem 804 and may include one or more levels of on-board cache.

System memory 804 may include computer system readable media in the form of volatile memory, such as random access memory (RAM) 822 or cache memory 824. Computer system 801 may further include other removable/non-removable, volatile/non-volatile computer system storage media. By way of example only, storage system 826 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 804 can include flash memory, e.g., a flash memory stick drive or a flash drive. Memory devices can be connected to memory bus 803 by one or more data media interfaces. The memory 804 may include at least one program product having a set (e.g., at least one) of program modules that are configured to carry out the functions of various embodiments.

One or more programs/utilities 828, each having at least one set of program modules 830 may be stored in memory 804. The programs/utilities 828 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 828 and/or program modules 830 generally perform the functions or methodologies of various embodiments.

Although the memory bus 803 is shown in FIG. 8 as a single bus structure providing a direct communication path among the CPUs 802, the memory subsystem 804, and the I/O bus interface 810, the memory bus 803 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 810 and the I/O bus 808 are shown as single respective units, the computer system 801 may, in some embodiments, contain multiple I/O bus interface units 810, multiple I/O buses 808, or both. Further, while multiple I/O interface units are shown, which separate the I/O bus 808 from various communications paths running to the various I/O devices, in other embodiments some or all of the I/O devices may be connected directly to one or more system I/O buses.

In some embodiments, the computer system 801 may be a multi-user mainframe computer system, a single-user system, or a server computer or similar device that has little or no direct user interface, but receives requests from other computer systems (clients). Further, in some embodiments, the computer system 801 may be implemented as a desktop computer, portable computer, laptop or notebook computer, tablet computer, pocket computer, telephone, smartphone, network switches or routers, or any other appropriate type of electronic device.

It is noted that FIG. 8 is intended to depict the representative major components of an exemplary computer system 801. In some embodiments, however, individual components may have greater or lesser complexity than as represented in FIG. 8, components other than or in addition to those shown in FIG. 8 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A method for smart cloud object storage management, the method comprising:
   receiving, by a processor, a request for storage in a blockchain network, wherein the request includes information as to a specific storage that is required;
   committing the request to the blockchain network;
   providing the request to one or more proposing entities;
   receiving, from the one or more proposing entities, respective proposals in response to the request for storage;
   utilizing a natural language processing (NLP) technique to analyze the respective proposals;
   comparing the analyzed respective proposals to the information included in the request;
   transitioning one or more nodes in the blockchain network into recommendation nodes, wherein the recommendation nodes incorporate the NLP technique;
   communicating the recommendation nodes with one or more endorsing nodes in the blockchain network, wherein the one or more endorsing nodes utilize respective recommendations from the recommendation nodes to assist in determining a best matched proposal;
   determining which of the respective proposals best match the information included in the request, wherein which of the respective proposals that best matches the information included in the request is the best matched proposal; and
   accepting, automatically, the best matched proposal.

2. The method of claim 1, further comprising:
   storing the best matched proposal in the blockchain network;
   identifying that a second request for storage in the blockchain network has been received;
   determining, utilizing the recommendation nodes, that the second request is within a threshold limit of the request; and
   accepting, automatically, the best matched proposal for the second request.

3. The method of claim 1, further comprising:
   adding the best matched proposal to the blockchain network;
   displaying the best matched proposal to each of the one or more proposing entities; and
   providing the one or more proposing entities with an option to adapt their respective proposals to the best matched proposal.

4. The method of claim 1, wherein the request further includes a compliance requirement for storage, wherein the compliance requirement indicates one or more necessities for storage.

5. The method of claim 4, wherein the request further includes a size of storage needed and a number of replicas to be stored in the storage.

6. A system for smart cloud object storage management, the system comprising:
   a memory; and
   a processor in communication with the memory, the processor being configured to perform operations comprising:
   receiving a request for storage in a blockchain network, wherein the request includes information as to a specific storage that is required;
   committing the request to the blockchain network;
   providing the request to one or more proposing entities;
   receiving, from the one or more proposing entities, respective proposals in response to the request for storage;
   utilizing a natural language processing (NLP) technique to analyze the respective proposals;
   comparing the analyzed respective proposals to the information included in the request transitioning one or more nodes in the blockchain network into recommendation nodes, wherein the recommendation nodes incorporate the NLP technique;
   communicating the recommendation nodes with one or more endorsing nodes in the blockchain network, wherein the one or more endorsing nodes utilize respective recommendations from the recommendation nodes to assist in determining a best matched proposal;
   determining which of the respective proposals best match the information included in the request, wherein which of the respective proposals that best matches the information included in the request is the best matched proposal; and
   accepting, automatically, the best matched proposal.

7. The system of claim 6, wherein the operations further comprise:
   storing the best matched proposal in the blockchain network;
   identifying that a second request for storage in the blockchain network has been received;
   determining, utilizing the recommendation nodes, that the second request is within a threshold limit of the request; and
   accepting, automatically, the best matched proposal for the second request.

8. The system of claim 6, wherein the operations further comprise:
   adding the best matched proposal to the blockchain network;
   displaying the best matched proposal to each of the one or more proposing entities; and
   providing the one or more proposing entities with an option to adapt their respective proposals to the best matched proposal.

9. The system of claim 6, wherein the request further includes a compliance requirement for storage, wherein the compliance requirement indicates one or more necessities for storage.

10. The system of claim 9, wherein the request further includes a size of storage needed and a number of replicas to be stored in the storage.

11. A computer program product for smart cloud object storage management, the computer program product comprising a computer readable storage medium having program instructions embodied therewith, the program instructions executable by a processor to cause the processors to perform a function, the function comprising:

receiving a request for storage in a blockchain network, wherein the request includes information as to a specific storage that is required;

committing the request to the blockchain network;

providing the request to one or more proposing entities;

receiving, from the one or more proposing entities, respective proposals in response to the request for storage;

utilizing a natural language processing (NLP) technique to analyze the respective proposals;

comparing the analyzed respective proposals to the information included in the request;

transitioning one or more nodes in the blockchain network into recommendation nodes, wherein the recommendation nodes incorporate the NLP technique;

communicating the recommendation nodes with one or more endorsing nodes in the blockchain network, wherein the one or more endorsing nodes utilize respective recommendations from the recommendation nodes to assist in determining a best matched proposal;

determining which of the respective proposals best match the information included in the request, wherein which of the respective proposals that best matches the information included in the request is the best matched proposal; and accepting, automatically, the best matched proposal.

12. The computer program product of claim 11, further comprising:

storing the best matched proposal in the blockchain network;

identifying that a second request for storage in the blockchain network has been received;

determining, utilizing the recommendation nodes, that the second request is within a threshold limit of the request; and accepting, automatically, the best matched proposal for the second request.

13. The computer program product of claim 11, further comprising:

adding the best matched proposal to the blockchain network;

displaying the best matched proposal to each of the one or more proposing entities; and providing the one or more proposing entities with an option to adapt their respective proposals to the best matched proposal.

14. The computer program product of claim 11, wherein the request further includes a compliance requirement for storage, wherein the compliance requirement indicates one or more necessities for storage.

* * * * *